US012795523B2

(12) United States Patent
Nam et al.

(10) Patent No.: US 12,795,523 B2
(45) Date of Patent: Nov. 10, 2026

(54) ELECTRONIC DEVICE FOR MANUAL SEARCH, AND OPERATING METHOD THEREFOR

(71) Applicant: SAMSUNG ELECTRONICS CO., LTD., Suwon-si (KR)

(72) Inventors: Kipyo Nam, Suwon-si (KR); Jinyup Kim, Suwon-si (KR); Myonghwan Jung, Suwon-si (KR); Changhyun Joo, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 288 days.

(21) Appl. No.: 18/592,036

(22) Filed: Feb. 29, 2024

(65) Prior Publication Data

US 2024/0205803 A1 Jun. 20, 2024

Related U.S. Application Data

(63) Continuation of application No. PCT/KR2022/009060, filed on Jun. 24, 2022.

(30) Foreign Application Priority Data

Aug. 30, 2021 (KR) ........................ 10-2021-0114936
Dec. 8, 2021 (KR) ........................ 10-2021-0174396

(51) Int. Cl.
*H04W 48/16* (2009.01)
*H04M 1/72472* (2021.01)
*H04W 84/04* (2009.01)

(52) U.S. Cl.
CPC ....... *H04W 48/16* (2013.01); *H04M 1/72472* (2021.01); *H04W 84/042* (2013.01)

(58) Field of Classification Search
CPC ............................ H04W 48/18; H04W 84/042
See application file for complete search history.

(56) References Cited

U.S. PATENT DOCUMENTS 8,843,995 B2 9/2014 Buckley et al.
9,049,647 B1 6/2015 Ravuvari et al.
(Continued)

FOREIGN PATENT DOCUMENTS

JP 2006-197603 A 7/2006
KR 10-0605828 B1 7/2006
(Continued)

OTHER PUBLICATIONS

Extended European Search Report dated Oct. 30, 2024, issued by the European Patent Office in European Application No. 22864837.4.
(Continued)

*Primary Examiner* — Nabil H Syed
(74) *Attorney, Agent, or Firm* — Sughrue Mion, PLLC

(57) ABSTRACT

Provided are an electronic device and method including, based on an input related to a public land mobile network (PLMN) scan being detected, performing a network scan related to a cellular network through a first communication circuit; acquiring network information related to the cellular network of at least one external electronic device through direct communication, based on the input; generating a network list comprising at least one PLMN and at least one radio access technology (RAT), based on at least one of a result of the network scan or the network information related to the cellular network of the at least one external electronic device; and providing information related to the network list.

14 Claims, 12 Drawing Sheets

(56) References Cited

U.S. PATENT DOCUMENTS

| | | | |
|---|---|---|---|
| 9,894,589 B2 | 2/2018 | Balasubramanian et al. | |
| 10,251,206 B2 | 4/2019 | Aoki | |
| 10,602,432 B2 | 3/2020 | Kim et al. | |
| 2005/0054291 A1 | 3/2005 | Park | |
| 2006/0160532 A1 | 7/2006 | Buckley et al. | |
| 2008/0242297 A1 | 10/2008 | Lee et al. | |
| 2008/0274737 A1 | 11/2008 | Lee | |
| 2010/0081433 A1* | 4/2010 | Lee | H04W 48/18 455/434 |
| 2011/0256869 A1* | 10/2011 | Zhang | H04W 24/02 455/435.2 |
| 2012/0190361 A1 | 7/2012 | Shaikh et al. | |
| 2013/0189978 A1 | 7/2013 | Lee et al. | |
| 2014/0157135 A1 | 6/2014 | Lee et al. | |
| 2014/0287690 A1 | 9/2014 | Kim | |
| 2015/0289156 A1 | 10/2015 | Jung et al. | |
| 2016/0150357 A1 | 5/2016 | Jung et al. | |
| 2016/0219501 A1 | 7/2016 | Chang et al. | |
| 2016/0345151 A1* | 11/2016 | Chen | H04W 48/16 |
| 2018/0063751 A1 | 3/2018 | Shi et al. | |
| 2019/0347216 A1 | 11/2019 | Cheon et al. | |
| 2021/0258869 A1 | 8/2021 | Di et al. | |

FOREIGN PATENT DOCUMENTS

| | | |
|---|---|---|
| KR | 10-0892618 B1 | 4/2009 |
| KR | 10-0914882 B1 | 8/2009 |
| KR | 10-2012-0085191 A | 7/2012 |
| KR | 10-2014-0074152 A | 6/2014 |
| KR | 10-2014-0116350 A | 10/2014 |
| KR | 10-2016-0134439 A | 11/2016 |
| KR | 10-1735381 B1 | 5/2017 |
| KR | 10-1779750 B1 | 10/2017 |
| KR | 10-1871720 B1 | 6/2018 |
| KR | 10-2018-0076863 A | 7/2018 |
| KR | 10-1900198 B1 | 9/2018 |
| KR | 10-2274730 B1 | 7/2021 |

OTHER PUBLICATIONS

International Search Report (PCT/ISA/210) issued by the International Searching Authority on Sep. 30, 2022 in corresponding International Application No. PCT/KR2022/009060.

Written Opinion (PCT/ISA/237) issued by the International Searching Authority on Sep. 30, 2022 in corresponding International Application No. PCT/KR2022/009060.

* cited by examiner

ELECTRONIC DEVICE FOR MANUAL SEARCH, AND OPERATING METHOD THEREFOR

CROSS-REFERENCE TO RELATED APPLICATIONS

This application is a bypass continuation application of International Application No. PCT/KR2022/009060, filed on Jun. 24, 2022, which is based on and claims priority to Korean Patent Application No. 10-2021-0114936, filed on Aug. 30, 2021, and Korean Patent Application No. 10-2021-0174396, filed on Dec. 8, 2021, in the Korean Patent Office, the disclosures of which are incorporated by reference herein in their entireties.

BACKGROUND

1. Field

The disclosure relates to an apparatus and a method for performing a manual search through direct communication by an electronic device.

2. Description of Related Art

In a wireless communication system, a public land mobile network (PLMN) may indicate identification information of a network operated by a communication service provider.

An electronic device may select a PLMN in which the electronic device is registered based on a user input. For example, the electronic device may perform a network scan (for example, manual scan) for frequencies which can be supported by the electronic device based on a user input. A network list including at least one PLMN found through the network scan may be displayed on a display of the electronic device. The electronic device may register a location of the electronic device in the PLMN selected from the network list displayed on the display based on a user input.

When an electronic device performs a network scan for detecting a PLMN which the electronic device can register, the electronic device scans (for example, full band scan) at least one radio access technology (RAT) and/or at least one frequency band which can be supported by the electronic device in a predetermined order, so delay for a network scan may be generated.

The electronic device may perform a network scan in the state (for example, idle state) in which there is no signal transmission and/or reception using radio resources. When transmission and/or reception of signals and/or data using radio resources is generated during the network scan, the electronic device may stop or postpone the network scan. The electronic device may have increasing time delay for the network scan due to stopping or postponing of the network scan.

SUMMARY

Provided are an apparatus and a method for reducing time delay due to a scan for a PLMN which the electronic device can register by the electronic device.

According to an aspect of the disclosure, there is provided an electronic device including: a display; an input device; memory configured to store instructions; a first communication circuit configured to support cellular communication; a second communication circuit configured to support direct communication; and at least one processor operatively connected to the display, the input device, the memory, the first communication circuit, and the second communication circuit, wherein the at least one processor is configured to execute the instructions to cause the electronic device to: based on an input related to a public land mobile network (PLMN) scan being detected through the input device, perform a network scan related to a cellular network through the first communication circuit; acquire network information related to the cellular network of at least one external electronic device through the direct communication using the second communication circuit, based on the input; generate a network list including at least one PLMN and at least one radio access technology (RAT), based on at least one of a result of the network scan or the network information related to the cellular network of the at least one external electronic device; and provide information related to the network list through the display.

The network information related to the cellular network of the at least one external electronic device may include information about at least one of a PLMN of the at least one external electronic device, an RAT of the at least one external electronic device, a frequency band of the RAT, a frequency of a serving cell, a signal quality of the serving cell, or a signal quality of direct communication. The network information related to the cellular network of the at least one external electronic device is acquired using a message of a non-connectable type received from the at least one external electronic device via the direct communication using the second communication circuit.

The at least one processor may be further configured to execute the instructions to cause the electronic device to: detect a PLMN related to an RAT or a frequency band determined to be supported by the first communication circuit among at least one PLMN included in the network information related to the cellular network of the at least one external electronic device; and generate the network list, based on the detected PLMN and a PLMN collected through the network scan.

The at least one processor may be further configured to execute the instructions to cause the electronic device to, based on there being a previously generated network list based on an input related to the PLMN scan, combine the network list generated based on the detected PLMN and the PLMN collected through the network scan and the previously generated network list into one network list.

The at least one processor may be further configured to execute the instructions to cause the electronic device to detect at least one PLMN corresponding to a home PLMN (HPLMN), a user PLMN, or an operator PLMN among PLMNs included in the network list, wherein the at least one detected PLMN may be arranged according to a predetermined priority, and wherein at least one PLMN collected through the direct communication may be arranged in a random order among remaining PLMNs except for the at least one detected PLMN in the network list.

The at least one processor may be further configured to execute the instructions to cause the electronic device to: detect at least one PLMN corresponding to a home PLMN (HPLMN), a user PLMN, or an operator PLMN among PLMNs included in the network list; measure a signal quality related to at least one PLMN collected through the direct communication among remaining PLMNs except for the at least one detected PLMN in the network list; and classify the at least one PLMN collected through the direct communication among the remaining PLMNs into high quality signal PLMNs or low quality signal PLMNs, based on a signal quality of each PLMN, wherein the at least one detected PLMN may be arranged according to a predetermined priority, wherein at least one PLMN classified as the high quality signal PLMNs may be arranged in a random order, and wherein at least one PLMN classified as the low quality signal PLMNs may be arranged based on the signal quality.

The at least one processor may be further configured to execute the instructions to cause the electronic device to: identify a signal quality related to the direct communication in the network information related to the cellular network of the at least one external electronic device corresponding to at least one PLMN collected through the direct communication among the remaining PLMNs except for the at least one detected PLMN in the network list; estimate a distance to the electronic device, based on the signal quality related to the direct communication in the network information related to the cellular network of the at least one external electronic device corresponding to each PLMN; and update a signal quality of a serving cell identified in the network information related to the cellular network of the at least one external electronic device corresponding to each PLMN, based on a reference value corresponding to the distance to the electronic device.

The second communication circuit may be configured to support direct communication based on at least one of a WLAN (for example, Wi-Fi), Bluetooth, Bluetooth low energy (BLE), or ultra-wideband (UWB).

According to an aspect of the method of operating an electronic device, the method including: based on an input related to a public land mobile network (PLMN) scan being detected, performing a network scan related to a cellular network through a first communication circuit; acquiring network information related to the cellular network of at least one external electronic device through direct communication, based on the input; generating a network list including at least one PLMN and at least one radio access technology (RAT), based on at least one of a result of the network scan or the network information related to the cellular network of the at least one external electronic device; and providing information related to the network list.

The network information related to the cellular network of the at least one external electronic device may include information on at least one of a PLMN of the at least one external electronic device, an RAT of the at least one external electronic device, a frequency band of the RAT, a frequency of a serving cell, a signal quality of the serving cell, or a signal quality of direct communication. The network information related to the cellular network of the at least one external electronic device is acquired using a message of a non-connectable type received from the at least one external electronic device via the direct communication using the second communication circuit The generating of the network list may include: detecting a PLMN related to an RAT or a frequency band determined to be supported by the electronic device among at least one PLMN included in the network information related to the cellular network of the at least one external electronic device; and generating the network list, based on the detected PLMN and a PLMN collected through the network scan.

The method may further include, based on there being a previously generated network list based on an input related to the PLMN scan, combining the network list generated based on the detected PLMN and the PLMN collected through the network scan and the previously generated network list into one network list.

The method may further include detecting at least one PLMN corresponding to a home PLMN (HPLMN), a user PLMN, or an operator PLMN among PLMNs included in the network list, wherein the at least one detected PLMN may be arranged according to a predetermined priority, and wherein at least one PLMN collected through the direct communication may be arranged in a random order among remaining PLMNs except for the at least one detected PLMN in the network list.

The method may further include detecting at least one PLMN corresponding to a home PLMN (HPLMN), a user PLMN, or an operator PLMN among PLMNs included in the network list; measuring a signal quality related to at least one PLMN collected through the direct communication among remaining PLMNs except for the at least one detected PLMN in the network list; and classifying the at least one PLMN collected through the direct communication among the remaining PLMNs into high quality signal PLMNs or low quality signal PLMNs, based on a signal quality of each PLMN, wherein the at least one detected PLMN may be arranged according to a predetermined priority, wherein at least one PLMN classified as the high quality signal PLMNs may be arranged in a random order, and wherein at least one PLMN classified as the low quality signal PLMNs may be arranged based on the signal quality.

The estimating of the signal quality may include: identifying a signal quality related to the direct communication in the network information related to the cellular network of the at least one external electronic device corresponding to at least one PLMN collected through the direct communication among the remaining PLMNs except for the at least one detected PLMN in the network list; estimating a distance to the electronic device, based on the signal quality related to the direct communication in the network information related to the cellular network of the at least one external electronic device corresponding to each PLMN; and updating a signal quality of a serving cell identified in the network information related to the cellular network of the external electronic device corresponding to each PLMN, based on a reference value corresponding to the distance to the electronic device.

According to one or more embodiments, when an electronic device performs a manual scan, the electronic device collects network information related to the cellular network of at least one external electronic device through direct communication (for example, device to device (D2D), and thus may provide a user with a list of a plurality of networks (for example, a list of PLMNs) within a relatively short time.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, various embodiments are described in detail with reference to the accompanying drawings.

Figure 1:
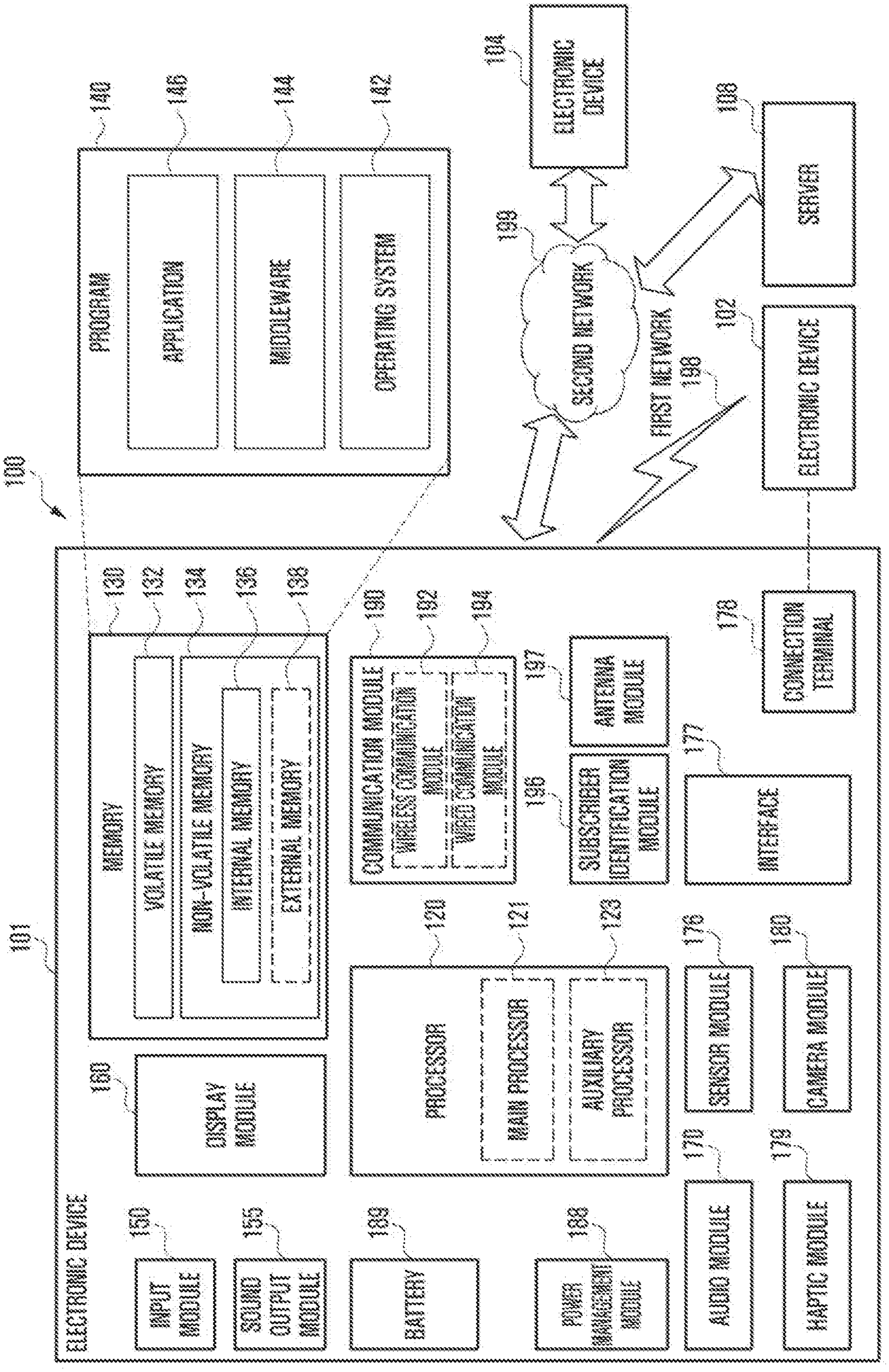
FIG. 1 is a block diagram of an electronic device within a network environment according to one or more embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC). The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. The subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IOT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
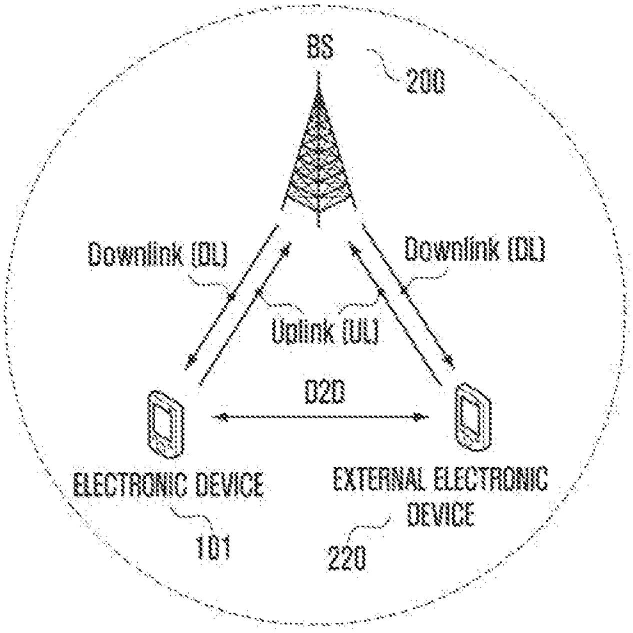
FIG. 2 illustrates an example of a wireless communication system supporting direct communication according to one or more embodiments.

FIG. 2 illustrates an example of a wireless communication system supporting direct communication according to various embodiments.

According to various embodiments referring to FIG. 2, an external electronic device 220 may be located within coverage of a base station (BS) 200. According to an embodiment, the external electronic device 220 may receive data and/or a signal (for example, control information) from the BS 200 through a downlink (DL). The external electronic device 220 may transmit data and/or a signal (for example, control information) to the BS 200 through an uplink (UL). For example, the coverage of the BS 200 may include an area (or a service area) in which data and/or a signal can be transmitted and/or received to and/or from the BS 200.

According to various embodiments, the electronic device 101 may transmit and/or receive data and/or a signal (for example, control information) to and/or from the external electronic device 220 through direct communication (for example, device to device (D2D). For example, direct communication may include direct communication based on a short-range communication network such as WLAN (for example, Wi-Fi), Bluetooth, Bluetooth low energy (BLE), and/or ultra-wideband (UWB). For example, direct communication may support multi-peer connectivity framework (MCF).

According to various embodiments, the electronic device 101 may access the BS 200 based on network information related to the cellular network provided from the external electronic device 220 through direct communication. According to an embodiment, the electronic device 101 may acquire network information related to the BS 200 from the external electronic device 220 through direct communication. The electronic device 101 may perform a network scan based on the network information related to the BS 200. The electronic device 101 may access the BS 200 found through the network scan based on the network information related to the BS 200. According to an embodiment, the electronic device 101 may receive data and/or a signal (for example, control information) from the BS 200 through the downlink (DL) based on access to the BS 200. The electronic device 101 may transmit data and/or a signal (for example, control information) to the BS 200 through the uplink (UL) based on access to the BS 200.

According to various embodiments, the electronic device 101 may access the BS 200 based on network information acquired through the network scan. According to an embodiment, the electronic device 101 may acquire network information related to the BS 200 through the network scan. For example, the network scan may include a series of operations for searching for a network in which the electronic device 101 can be registered. According to an embodiment, the electronic device 101 may access the BS 200 based on the network information related to the BS 200 acquired through the network scan.

Figure 3:
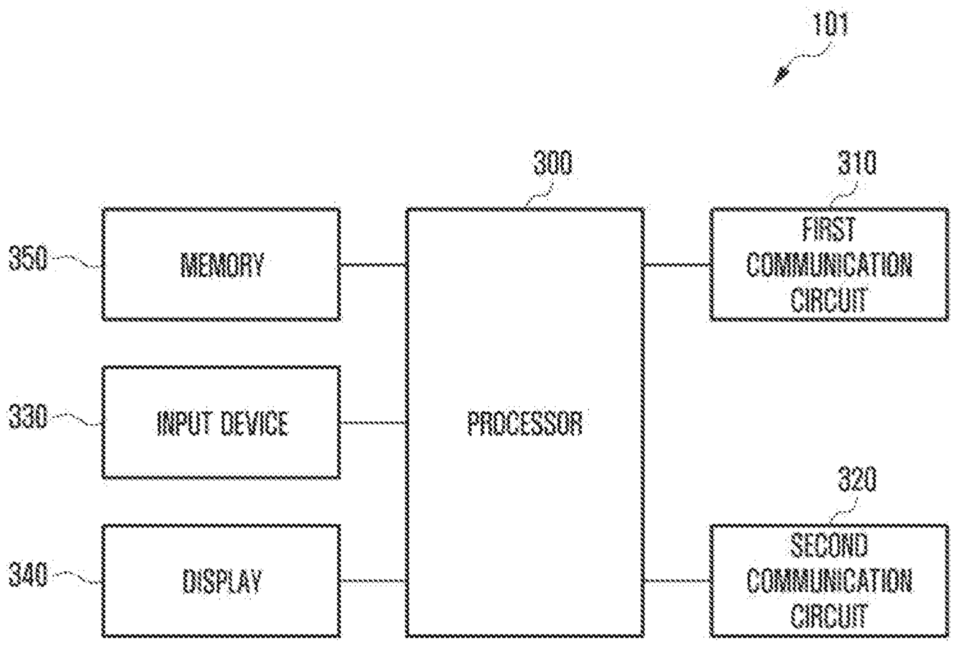
FIG. 3 is a block diagram illustrating an electronic device for acquiring network information through direct communication according to one or more embodiments.

FIG. 3 is a block diagram illustrating an electronic device for acquiring network information through direct communication according to various embodiments.

According to various embodiments referring to FIG. 3, the electronic device 101 may include a processor (e.g., including processing circuitry) 300, a first communication circuit (or first communication circuitry) 310, a second communication circuit (or second communication circuitry) 320, an input device 330, a display 340, and/or a memory 350. According to an embodiment, the processor 300 may be substantially the same as the processor 120 (for example, an application processor (AP)) of FIG. 1 or may include the processor 120. The first communication circuit 310 and/or the second communication circuit 320 may be substantially the same as the wireless communication module 192 of FIG. 1 or may include the wireless communication module 192. The input device 330 may be substantially the same as the input module 150 of FIG. 1 or may include the input module 150. The display 340 may be substantially the same as the display module 160 of FIG. 1 or may include the display module 160. The memory 350 may be substantially the same as the memory 130 of FIG. 1 or may include the memory 130. According to an embodiment, the processor 300 may be operatively connected to the first communication circuit 310, the second communication circuit 320, the input device 330, the display 340, and/or the memory 350.

According to various embodiments, the processor 300 may control the first communication circuit 310 to perform a network scan (for example, a PLMN scan or manual scan) related to a cellular network based on a user input related to the PLMN scan received through the input device 330. According to an embodiment, the processor 300 may control the first communication circuit 310 to perform a network scan for frequency bands (or frequencies) which can be supported by the electronic device 101 based on a user input for the PLMN scan received through the input device 330. For example, the processor 300 may control the first communication circuit 310 to perform a network scan related to at least some of frequency bands (or frequencies) which can be supported by the electronic device 101 selected according to a periodically designated order based on a predetermined first period. For example, the network scan (for example, PLMN scan) related to the cellular network may be periodically performed based on the predetermined first period until the network scan for all frequency bands which can be supported by the electronic device 101 is performed. For example, the network scan (for example, PLMN scan) related to the cellular network may include a series of operations of searching for (detecting) at least one PLMN through the network scan based on the frequency bands which can be supported by the electronic device 101. For example, at least one PLMN found (or detected) through the network scan may include a PLMN in which the electronic device 101 can be registered and/or a PLMN in which the electronic device 101 cannot be registered. For example, frequency bands which can be supported by the electronic device 101 may include frequency bands of radio access technology (RAT) such as a 2G network, a 3G network, a 4G network (for example, long-term evolution (LTE)), and/or a 5G network (for example, new radio (NR)) which can be supported by the electronic device 101. For example, the predetermined first period may indicate a period configured for performing the network scan related to the cellular network.

According to various embodiments, the processor 300 may control the second communication circuit 320 to acquire network information related to the cellular network of at least one external electronic device 220 through direct communication based on a user input related to a PLMN scan received through the input device 330. According to an embodiment, the processor 300 may control the second communication circuit 320 to periodically acquire network information of at least one external electronic device 220 through direct communication based on a predetermined second period until the network scan related to the cellular network is completed. For example, the predetermined second period is a period for acquiring network information of at least one external electronic device 220 through direct communication and may be configured to the same as or shorter than the predetermined first period.

According to an embodiment, the processor 300 may control the second communication circuit 320 to transmit a request message related to network information through direct communication based on a user input related to the PLMN scan received through the input device 330. For example, the request message related to the network information may include a BLE advertising message including indication information related to a request for network information. For example, the BLE advertising message may include a non-connectable type message.

According to an embodiment, the processor 300 may identify network information of at least one external electronic device 220 in a response message related to network information received through the second communication circuit 320 in response to the request message related to the network information. For example, the network information of the external electronic device 220 may include information on a serving PLMN of the external electronic device 220, a serving radio access technology (RAT) (or a serving frequency band), a frequency of a serving cell, a signal quality of a serving cell, and/or a signal quality of direct communication. For example, the serving PLMN may include information related to a PLMN of the network in which the external electronic device 220 is registered (for example, a mobile country code (MCC) and/or a mobile network code (MNC)). For example, the serving RAT may include information related to RAT of the network in which the external electronic device 220 is registered. For example, the frequency band of the serving cell may include information related to a frequency of a cell which the external electronic device 220 accesses. For example, the signal quality of the serving cell may indicate a quality of a signal received by the external electronic device 220 through the serving cell. For example, the signal quality of direct communication may indicate a quality of a signal received by the external electronic device 220 through direct communication. For example, the signal quality may include reference signal received power (RSRP) of the received signal, reference signal received quality (RSRQ), received signal code power (RSCP), and/or receiver signal strength indicator (RSSI). For example, the response message related to the network information may include a BLE advertising message including indication information related to a response of the network information and network information of the external electronic device 220.

According to various embodiments, the processor 300 may generate (or update) the network list based on the result of the network scan related to the cellular network and/or network information of at least one external electronic device 220. For example, the network list may include information related to at least one PLMN and/or at least one RAT. According to an embodiment, when the network scan related to the cellular network is performed through the first communication circuit 310 according to the predetermined first period, the processor 300 may generate (or update) the network list based on the result of the network scan related to the cellular network and network information of at least one external electronic device 220. According to an embodiment, network information of at least one external electronic device 220 is acquired through the second communication circuit 320 according to the predetermined second period, the processor 300 may generate (or update) the network list based on the result of the network scan related to the cellular network and the network information of at least one external electronic device 220.

According to an embodiment, the processor 300 may generate (or update) the network list by combining information related to at least one PLMN (for example, (PLMN and/or RAT) collected through the network scan related to the cellular network provided from the first communication circuit 310 and information related to at least one PLMN (for example, PLMN and/or RAT) collected through direct communication provided from the second communication circuit 320. For example, the processor 300 may detect at least one PLMN related to RAT and/or frequency bands which can be supported by the electronic device 101 among at least one PLMN collected through direct communication. The processor 300 may remove PLMNs which overlap at least one PLMN collected through the network scan related to the cellular network from at least one PLMN related to the RAT and/or the frequency bands which can be supported by the electronic device 101. The processor 300 may generate (or update) the network list by adding information related to at least one PLMN related to the RAT and/or the frequency bands which can be supported by the electronic device 101 from which the overlapping PLMNs have been removed to information related to at least one PLMN collected through the network scan related to the cellular network.

According to an embodiment, the processor 300 may generate (or update) the network list by accumulating information related to at least one PLMN collected through the network scan related to the cellular network and information related to at least one PLMN collected through direct communication until the network scan related to the cellular network is completed. For example, when there is a network list previously generated based on a user input related to the PLMN scan, the processor 300 may add information related to at least one PLMN including RAT and/or frequency bands which can be supported by the electronic device 101, from which overlapping PLMNs have been removed in the previously generated network list to information related to at least one PLMN collected through the network scan related to the cellular network.

According to various embodiments, the processor 300 may control the display 340 to display information related to the network list. According to an embodiment, when the network list is generated (or updated) based on the predetermined first period (or the predetermined second period), the processor 300 may control the display 340 to display information related to the network list. For example, the network list displayed on the display 340 may be arranged based on a predetermined scheme.

According to an embodiment, the processor 300 may arrange PLMNs corresponding to a home PLMN (HPLMN), a user PLMN, and/or an operator PLMN among PLMNs included in the network list according to a predetermined priority. For example, information related to the home PLMN, the user PLMN, and/or the operator PLMN may be included in a subscriber identity module (SIM) (not shown) of the electronic device 101.

According to an embodiment, the processor 300 may classify at least one PLMN which does not correspond to the home PLMN, the user PLMN, and/or the operator PLMN among the PLMNs collected through the network scan related to the cellular network included in the network list into high quality signal PLMNs and low quality signal PLMNs based on a signal quality (for example, RSSI). For example, the PLMNs classified as the high quality signal PLMNs may be randomly arranged based on a PLMN arrangement rule. For example, the PLMNs classified as the low quality signal PLMNs may be arranged based on a signal quality of each PLMN.

According to an embodiment, the processor 300 may classify PLMNs which do not correspond to the home PLMN, the user PLMN, and/or the operator PLMN among the PLMNs acquired from the external electronic device 220 included in the network list as the high quality signal PLMNs. For example, the PLMNs which do not correspond to the home PLMN, the user PLMN, and/or the operator PLMN among the PLMNs acquired from the external electronic device 220 may be randomly arranged based on an arrangement rule of the high quality signal PLMN.

According to an embodiment, the processor 300 may estimate a signal quality (for example, RSSI) of the electronic device 101 related to the PLMNs which do not correspond to the home PLMN, the user PLMN, and/or the operator PLMN among the PLMNs acquired from the external electronic device 220 included in the network list. The processor 300 may classify the PLMNs into high quality signal PLMNs and low quality signal PLMNs based on signal qualities of the electronic device 101 related to respective PLMNs. For example, the PLMNs classified as the high quality signal PLMNs may be randomly arranged based on a PLMN arrangement rule. For example, the PLMNs classified as the low quality signal PLMNs may be arranged based on a signal quality of each PLMN. For example, the signal quality of the electronic device 101 may indicate a signal quality expected in the case in which the electronic device 101 is registered in the network of the PLMN acquired from the external electronic device 220 through direct communication.

According to various embodiments, the first communication circuit 310 may support cellular communication of the electronic device 101. According to an embodiment, the first communication circuit 310 may transmit and/or receive data and/or control information to and/or from a network element (for example, the BS 200 of FIG. 2) through the cellular network. For example, the first communication circuit 310 may include a communication processor (CP) for cellular communication, a radio frequency integrated circuit (RFIC) and/or a radio frequency front end (RFFE). For example, the cellular network may include a 2G network (for example, global system for mobile communications (GSM)), a 3G network (for example, universal mobile telecommunications system (UMTS)), a 4G network (for example, long-term evolution (LTE)), and/or a 5G network (for example, new radio (NR)).

According to various embodiments, the second communication circuit 320 may support direct communication of the electronic device 101. According to an embodiment, the second communication circuit 320 may transmit and/or receive data and/or control information to and/or from at least one external electronic device 220 through direct communication. For example, the direct communication may be performed through a short-range communication network such as at least one of WLAN (for example, Wi-Fi), Bluetooth, Bluetooth low energy (BLE), or ultra-wideband (UWB). According to an embodiment, the first communication circuit 310 and the second communication circuit 320 may be distinguished logically (in software). According to an embodiment, the first communication circuit 310 and the second communication circuit 320 may be configured as different circuits or different hardware components.

According to various embodiments, the input device 330 may receive instructions or data to be used by an element (for example, the processor 300) of the electronic device 101 from the outside (for example, the user) of the electronic device 101. According to an embodiment, the input device 330 may include a touch screen, a touch pad, a microphone, a mouse, a keyboard, a key (for example, button), or a digital pen (for example, stylus pen).

According to various embodiments, the display device 340 may display information processed by the electronic device 101. According to an embodiment, the display device 340 may display information related to the network list. For example, the display device 340 may display the network list arranged by the processor 300. For example, the display device 340 may display information related to PLMNs collected through the network scan related to the cellular network included in the network list and information related to PLMNs acquired from the external electronic device 220 to be distinguished from each other.

According to various embodiments, the memory 350 may store various pieces of data used by at least one element (for example, the processor 300, the first communication circuit 310, the second communication circuit 320, the input device 330, and/or the display 340) of the electronic device 101. According to an embodiment, the data may include network information related to the cellular network of at least one external electronic device 220 acquired through direct communication and network information related to the cellular network of the electronic device 100. According to an embodiment, the memory 350 may store various instructions which can be executed through the processor 300.

According to various embodiments, the first communication circuit 310 may generate (or update) the network list. According to an embodiment, the first communication circuit 310 (for example, the communication processor) may generate (or update) the network list based on the result of the network scan related to the cellular network and/or network information related to the cellular network of at least one external electronic device 220 provided from the second communication circuit 320.

According to an embodiment, when the network scan related to the cellular network is performed through the first communication circuit 310 according to the predetermined first period, the first communication circuit 310 (for example, the communication processor) may generate (or update) the network list based on the result of the network scan related to the cellular network and network information related to the cellular network of at least one external electronic device 220.

According to an embodiment, when the network information related to the cellular network of at least one external electronic device 220 is acquired from the second communication circuit 320 according to the predetermined second period, the first communication circuit 310 (for example, the communication processor) may generate (or update) the network list based on the result of the network scan related to the cellular network and the network information related to the cellular network of at least one external electronic device 220.

According to an embodiment, the first communication circuit 310 (for example, the communication processor) may transmit information related to the generated (or updated) network list to the processor 300. According to an embodiment, the processor 300 may control the display 340 to display information related to the network list acquired from the first communication circuit 310.

According to various embodiments, an electronic device (for example, the electronic device 101 of FIG. 1, FIG. 2, or FIG. 3) may include a display (for example, the display module 160 of FIG. 1 or the display 340 of FIG. 3), an input device (for example, the input module 150 of FIG. 1 or the input device 330 of FIG. 3), a memory (for example, the memory 130 of FIG. 1 or the memory 350 of FIG. 3), a first communication circuit configured to support cellular communication (for example, the wireless communication module 192 of FIG. 1 or the first communication circuit 310 of FIG. 3), a second communication circuit configured to support direct communication (for example, the wireless communication module 192 of FIG. 1 or the second communication circuit 320 of FIG. 3), and at least one processor (for example, the processor 120 of FIG. 1 or the processor 300 of FIG. 3) operatively connected to the display, the input device, the memory, the first communication circuit, and the second communication circuit, wherein the processor is configured to perform a network scan related to a cellular network through the first communication circuit, based on an input related to a public land mobile network (PLMN) scan detected through the input device, acquire network information related to the cellular network of at least one external electronic device through the direct communication using the second communication circuit, based on the input, generate a network list including at least one PLMN and at least one radio access technology (RAT), based on at least one of a result of the network scan or the network information related to the cellular network of the at least one external electronic device, and output information related to the network list through the display.

According to various embodiments, the network information related to the cellular network of the external electronic device may include information on at least one of a PLMN of the external electronic device, an RAT of the external electronic device, a frequency band of the RAT, a frequency of a serving cell, a signal quality of the serving cell, or a signal quality of direct communication.

According to various embodiments, the processor may be configured to detect a PLMN related to an RAT and/or a frequency band determined to be supported by the first communication circuit among at least one PLMN included in the network information related to the cellular network of the external electronic device and generate the network list, based on the detected PLMN and a PLMN collected through the network scan.

According to various embodiments, the processor may be configured to, in case that there is a previously generated network list based on an input related to the PLMN scan, combine the network list generated based on the detected PLMN and the PLMN collected through the network scan and the previously generated network list into one network list.

According to various embodiments, the processor may be configured to detect at least one PLMN corresponding to a home PLMN (HPLMN), a user PLMN, and/or an operator PLMN among PLMNs included in the network list, the at least one detected PLMN may be arranged according to a predetermined priority, and at least one PLMN collected through the direct communication may be arranged in a random order among remaining PLMNs except for the at least one detected PLMN in the network list.

According to various embodiments, the processor may be configured to detect at least one PLMN corresponding to a home PLMN (HPLMN), a user PLMN, and/or an operator PLMN among PLMNs included in the network list, measure a signal quality related to at least one PLMN collected through the direct communication among remaining PLMNs except for the at least one detected PLMN in the network list, and classify the at least one PLMN collected through the direct communication among the remaining PLMNs into high quality signal PLMNs and/or low quality signal PLMNs, based on a signal quality of each PLMN, the at least one detected PLMN may be arranged according to a predetermined priority, at least one PLMN classified as the high quality signal PLMNs may be arranged in a random order, and at least one PLMN classified as the low quality signal PLMNs may be arranged based on the signal quality.

According to various embodiments, the processor may be configured to identify a signal quality related to the direct communication in the network information related to the cellular network of the external electronic device corresponding to at least one PLMN collected through the direct communication among the remaining PLMNs except for the at least one detected PLMN in the network list, estimate a distance to the electronic device, based on the signal quality related to the direct communication in the network information related to the cellular network of the external electronic device corresponding to each PLMN, and update a signal quality of a serving cell identified in the network information related to the cellular network of the external electronic device corresponding to each PLMN, based on a reference value corresponding to the distance to the electronic device.

According to various embodiments, the display may display the network list such that at least one PLMN collected through the network scan included in the network list is distinguished from at least one PLMN collected through the direct communication.

According to various embodiments, the second communication circuit may be configured to support direct communication based on at least one of a WLAN (for example, Wi-Fi), Bluetooth, Bluetooth low energy (BLE), or ultra-wideband (UWB).

According to various embodiments, an electronic device (for example, the electronic device 101 of FIG. 1, FIG. 2, or FIG. 3) may include a display (for example, the display module 160 of FIG. 1 or the display 340 of FIG. 3), an input device (for example, the input module 150 of FIG. 1 or the input device 330 of FIG. 3), a memory (for example, the memory 130 of FIG. 1 or the memory 350 of FIG. 3), a first communication circuit configured to support cellular communication (for example, the wireless communication module 192 of FIG. 1 or the first communication circuit 310 of FIG. 3), a second communication circuit configured to support direct communication (for example, the wireless communication module 192 of FIG. 1 or the second communication circuit 320 of FIG. 3), and at least one processor (for example, the processor 120 of FIG. 1 or the processor 300 of FIG. 3) operatively connected to the display, the input device, the memory, the first communication circuit, and the second communication circuit, wherein the processor may be configured to transmit a request signal related to a public land mobile network (PLMN) scan to the first communication circuit and the second communication circuit, based on an input related to the PLMN scan detected through the input device, acquire network information related to the cellular network of at least one external electronic device through the direct communication, perform a network scan related to a cellular network, based on the request signal related to the PLMN scan, generate a network list including at least one PLMN and at least one RAT, based on at least one of a result of the network scan or network information related to the cellular network of at least one external electronic device acquired through the second communication circuit, and output information related to the network list generated by the first communication circuit through the display.

Figure 4:
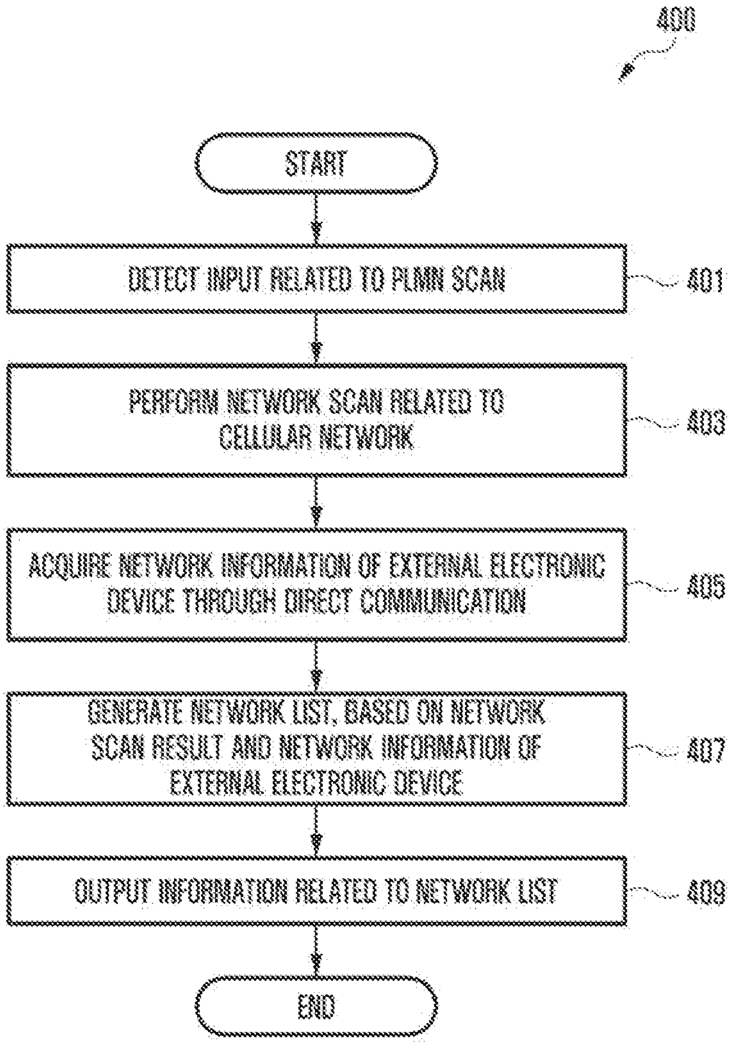
FIG. 4 is a flowchart illustrating a process in which the electronic device performs a PLM scan according to one or more embodiments.

FIG. 4 is a flowchart 400 illustrating a process of searching for a PLMN by an electronic device. In the following embodiments, respective operations may be sequentially performed but the sequential performance is not necessary. For example, the sequence of respective operations may be changed, and at least two operations may be performed in parallel. For example, the electronic device of FIG. 4 may be the electronic device 101 of FIG. 1, FIG. 2, or FIG. 3.

According to various embodiments referring to FIG. 4, the electronic device (for example, the processor 120 of FIG. 1 or the processor 300 of FIG. 3) may detect an input related to a PLMN scan in operation 401. According to an embodiment, the processor 300 may detect a user input for a PLMN scan through the input device 330. For example, the PLMN scan may include a series of operations of scanning (or searching) for at least one PLMN through a network scan based on frequency bands which can be supported by the electronic device 101. For example, the frequency bands which can be supported by the electronic device 101 may include frequency bands of radio access technology (RAT) such as a 2G network, a 3G network, a 4G network (for example, LTE), and/or a 5G network (for example, NR) which can be supported by the electronic device 101.

According to various embodiments, the electronic device (for example, the processor 120 or 300) may perform a network scan (for example, PLMN scan) related to a cellular network based on an input related to the PLMN scan in operation 403. According to an embodiment, the processor 300 may control the first communication circuit 310 to perform a network scan for a frequency band (or frequency) which can be supported by the electronic device 101 based on a user input for the PLMN scan received through the input device 330. For example, the processor 300 may control the first communication circuit 310 to perform a network scan related to at least some of frequency bands (or frequencies) which can be supported by the electronic device 101 selected according to a periodically designated order based on a predetermined first period. For example, the network scan (for example, PLMN scan) related to the cellular network may include a series of operations of searching for a PLMN corresponding to radio access technology which can be supported by the electronic device 101 through the network scan based on the frequency bands which can be supported by the electronic device 101. For example, the PLMN found (or detected) through the network scan (for example, PLMN scan) related to the cellular network may include a PLMN in which the electronic device 101 can be registered and/or a PLMN (for example, forbidden PLMN) in which the electronic device 101 cannot be registered. For example, the predetermined first period may indicate a period configured for performing the network scan related to the cellular network.

According to various embodiments, the electronic device (for example, the processor 120 or 300) may acquire network information of at least one external electronic device 220 through direct communication based on the input related to the PLMN scan in operation 405. According to an embodiment, the processor 300 may control the second communication circuit 320 to periodically acquire network information related to the cellular network of at least one external electronic device 220 through direct communication based on a predetermined second period until the network scan related to the cellular network is completed. For example, the processor 300 may control the second communication circuit 320 to transmit a request message related to network information through direct communication based on a user input related to the PLMN scan received through the input device 330. For example, when it is determined that the predetermined second period arrives, the processor 300 may control the second communication circuit 320 to transmit the request message related to the network information through direct communication. For example, the request message related to the network information may include a BLE advertising message including indication information related to a request for the network information. For example, the processor 300 may acquire network information of at least one external electronic device 220 from a response message related to the network information received through the second communication circuit 320 in response to the request message related to the network information. For example, the predetermined second period is a period for acquiring network information of at least one external electronic device 220 through direct communication and may be configured to the same as or shorter than the predetermined first period. For example, the network information of the external electronic device 220 may include information related to a serving PLMN of the external electronic device 220, serving RAT (or serving frequency band), a frequency of the serving cell, a signal quality of the serving cell, and/or a signal quality of direct communication. For example, the response message related to the network information may include a BLE advertising message including indication information related to a response of the network information and network information of the external electronic device 220.

According to various embodiments, the electronic device (for example, the processor 120 or 300) may generate (or update) the network list based on the result of the network scan related to the cellular network and/or the network information of the external electronic device 220 in operation 407. For example, the network list may include information related to at least one PLMN and/or at least one RAT acquired through the network scan related to the cellular network and/or direct communication. According to an embodiment, when receiving the result of the network scan related to the cellular network through the first communication circuit 310 according to the predetermined first period or acquiring the network information of at least one external electronic device 220 through the second communication circuit 320 according to the predetermined second period, the processor 300 may generate (or update) the network list. According to an embodiment, the processor 300 may generate (or update) the network list by combining information related to at least one PLMN (for example, (PLMN and/or RAT) collected through the network scan related to the cellular network provided from the first communication circuit 310 and information related to at least one PLMN (for example, PLMN and/or RAT) collected through direct communication provided from the second communication circuit 320. According to an embodiment, the processor 300 may generate (or update) the network list by accumulating information related to at least one PLMN collected through the network scan related to the cellular network and information related to at least one PLMN collected through direct communication until the network scan related to the cellular network is completed. For example, when there is a network list previously generated based on a user input related to the PLMN scan, the processor 300 may add information related to at least one PLMN including RAT and/or frequency bands which can be supported by the electronic device 101, from which overlapping PLMNs have been removed in the previously generated network list to information related to at least one PLMN collected through the network scan related to the cellular network.

According to various embodiments, the electronic device (for example, the processor 120 or 300) may output information related to the network list in operation 409. According to an embodiment, the processor 300 may control the display 340 to display information related to the network list. For example, when the network list is generated (or updated) according to the predetermined first period or the predetermined second period, the processor 300 may control the display 340 to display information related to the network list.

According to an embodiment, the network list displayed on the display 340 may be arranged according to an arrangement rule of PLMNs corresponding to a home PLMN, a user PLMN, and/or an operator PLMN, high quality signal PLMNs, and/or low quality signal PLMNs. For example, PLMNs which do not correspond to the home PLMN, the user PLMN, and/or the operator PLMN among the PLMNs acquired from the external electronic device 220 included in the network list may be arranged according to an arrangement rule of the high quality signal PLMN (for example, random order). For example, the PLMNs which do not correspond to the home PLMN, the user PLMN, and/or the operator PLMN among the PLMNs acquired from the external electronic device 220 included in the network list may be classified into high quality signal PLMNs or low quality signal PLMNs based on the signal quality of the electronic device 101 related to the PLMN. For example, the PLMNs classified as the high quality signal PLMNs may be arranged according to the arrangement rule of the high quality signal PLMN. For example, the PLMNs classified as the low quality signal PLMNs may be arranged based on a signal quality of each PLMN.

According to an embodiment, the network list displayed on the display 340 may be displayed such that PLMNs collected through the network scan related to the cellular network are distinguished from PLMNs acquired from the external electronic device 220.

Figure 5:
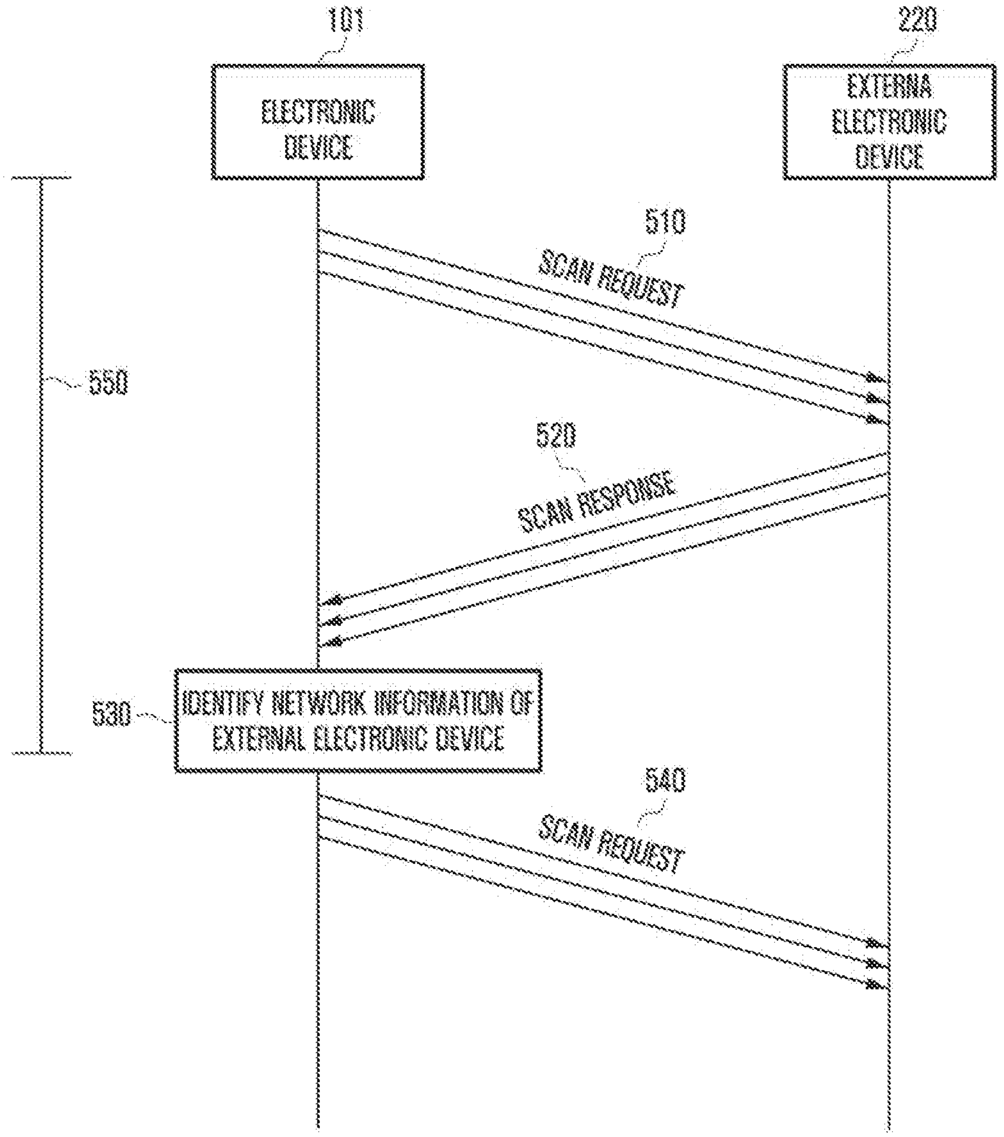
FIG. 5 illustrates an example in which the electronic device acquires network information of the external electronic device according to one or more embodiments.
Figure 6:
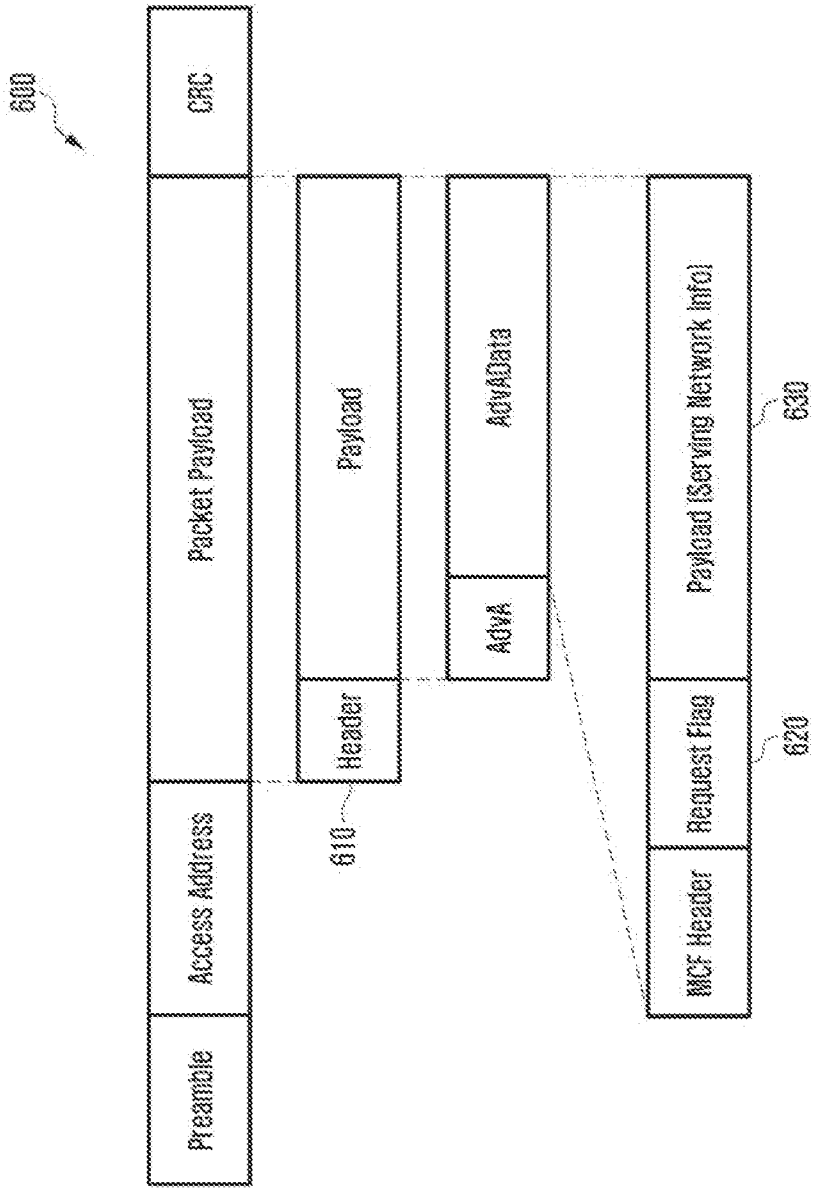
FIG. 6 illustrates an example of a BLE advertising message according to one or more embodiments.

FIG. 5 illustrates an example in which the electronic device acquires network information of the external electronic device according to various embodiments. For example, at least some of FIG. 5 may refer to FIG. 6. FIG. 6 illustrates an example of a BLE advertising message according to various embodiments.

According to various embodiments referring to FIGS. 5 and 6, the electronic device 101 may transmit a request message related to network information through direct communication based on an input related to a PLMN scan in operation 510. According to an embodiment, the electronic device 101 may transmit (or broadcast) a request message related to network information at predetermined intervals ($T_{adv}$) a predetermined number of times ($N_{adv}$). For example, the request message related to the network information may include a non-connectable type BLE advertising message including indication information related to a request for network information. For example, a BLE advertising message 600 may include a preamble, an access address, a packet payload, and a cyclical redundancy check (CRC) as shown in FIG. 6. For example, the BLE advertising message may show that the BLE advertising message is a non-connectable type through a protocol data unit (PDU) type of a header 610 included in the packet payload. For example, the BLE advertising message may include indication information related to the request for the network information through a request flag 620 of an advertising data (advData) field of the payload included in the packet payload.

According to various embodiments, when receiving the request message related to the network information through direct communication, the external electronic device 220 may transmit a response message related to the network information including the network information of the external electronic device 220 through direct communication in operation 520. According to an embodiment, the external electronic device 220 may transmit (or broadcast) a response message related to network information corresponding to each of the request messages related to the network information transmitted at predetermined intervals ($T_{adv}$) a predetermined number of times ($N_{adv}$). For example, the response message related to the network information may include a non-connectable type BLE advertising message including indication information related to the response of the network information and network information of the external electronic device 220. For example, the BLE advertising message 600 may indicate that the BLE advertising message is a non-connectable type through a PDU type of the header 610 included in the packet payload. The BLE advertising message may include indication information related to the response of the network information through the request flag 620 of the advertising data field of the payload included in the packet payload. The BLE advertising message may include network information of the external electronic device 220 through the payload 630 of the advertising data field of the payload included in the packet payload.

According to various embodiments, the electronic device 101 may identify network information of the external electronic device 220 in the response message related to the network information received through direct communication in operation 530. For example, the network information of the external electronic device 220 may include information related to a serving PLMN of the external electronic device 220, serving RAT (or serving frequency band), a frequency of the serving cell, a signal quality of the serving cell, and/or a signal quality of direct communication.

According to various embodiments, the electronic device 101 may periodically transmit a request message related to the network information through direct communication according to the predetermined second period 550 in operation 540. According to an embodiment, the electronic device 101 may periodically transmit the request message related to the network information through direct communication according to the predetermined second period 550 until the network scan related to the cellular network is completed. For example, the predetermined second period is a period for acquiring network information of at least one external electronic device 220 through direct communication and may be configured to be the same as or shorter than the predetermined first period for the network scan related to the cellular network.

Figure 7:
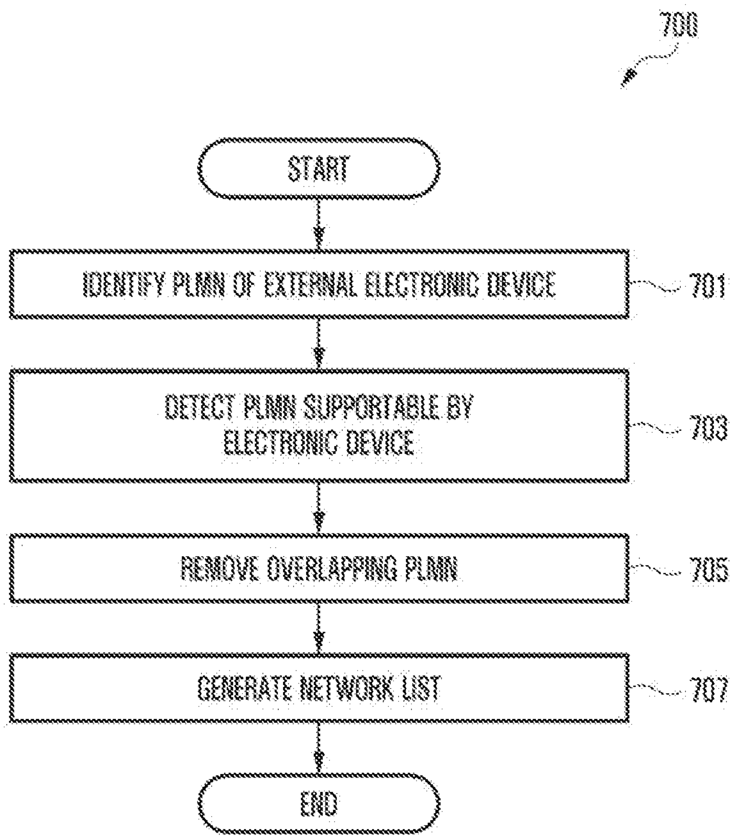
FIG. 7 is a flowchart illustrating a process in which the electronic device generates a network list according to one or more embodiments.

FIG. 7 is a flowchart 700 illustrating a process in which the electronic device generates a network list according to various embodiments. According to an embodiment, at least some of FIG. 7 may be detailed operations of operation 407 of FIG. 4. In the following embodiments, respective operations may be sequentially performed but the sequential performance is not necessary. For example, the sequence of respective operations may be changed, and at least two operations may be performed in parallel. For example, the electronic device of FIG. 7 may be the electronic device 101 of FIG. 1, FIG. 2, or FIG. 3.

According to various embodiments referring to FIG. 7, when acquiring network information of at least one external electronic device 220 through direct communication (operation 405 of FIG. 4), the electronic device (for example, the processor 120 of FIG. 1 or the processor 300 of FIG. 3) may identify information related to the PLMN of at least one external electronic device 220 based on network information of at least one external electronic device 220 in operation 701. For example, information related to the PLMN of the external electronic device 220 may include information related to PLMNs and RAT of the network in which the external electronic device 220 is registered.

According to various embodiments, the electronic device (for example, the processor 120 or 300) may detect information related to PLMNs which can be supported by the electronic device 101 in information related to PLMNs of at least one external electronic device 220 collected through direct communication in operation 703. For example, the PLMNs which can be supported by the electronic device 101 may include at least one PLMN related to RAT and/or frequency bands which can e supported by the electronic device 101 among the PLMNs of at least one external electronic device 220 collected through direct communication. For example, information related to PLMNs (for example, MCC/MNC) of at least one external electronic device 220 collected through direct communication may include LTE/3G 450/05, LTE 450/06, GSM 450/11, and LTE 450/12. When the electronic device 101 does not support global system for mobile communication (GSM), the PLMNs which can be supported by the electronic device 101 may include LTE/3G 450/05, LTE 450/06, and LTE 450/12 among LTE/3G 450/05, LTE 450/06, GSM 450/11, and LTE 450/12.

According to various embodiments, the electronic device (for example, the processor 120 or 300) may remove a PLMN which overlaps at least one PLMN collected through the network scan related to the cellular network from information related to the PLMNs which can be supported by the electronic device 101 in operation 705. According to an embodiment, when LTE/3G 450/05 and LTE/3G 450/08 are collected through the network scan related to the cellular network, the processor 300 may remove LTE/3G 450/05 from LTE/3G 450/05, LTE 450/06, and LTE 450/12 corresponding to the PLMNs which can be supported by the electronic device 101.

According to various embodiments, the electronic device (for example, the processor 120 or 300) may generate (or update) the network list of the electronic device 101 based on information related to PLMNs which can be supported by the electronic device 101 from which the overlapping PLMN has been removed information related to at least one PLMN collected through the network scan related to the cellular network in operation 707. According to an embodiment, the processor 300 may generate (or update) the network list by adding information related to the PLMNs which can be supported by the electronic device 101 from which the overlapping PLMN has been removed to information related to at least one PLMN collected through the network scan related to the cellular network. For example, the processor 300 may generate (or update) the network list by adding LTE 450/06 and LTE 450/12 from which the overlapping PLMN (for example, LTE/3G 450/05) has been removed to LTE/3G 450/05 and LTE/3G 450/08 collected through the network scan related to the cellular network.

According to various embodiments, the electronic device 101 may arrange the network list according to an arrange rule of PLMNs corresponding to the home PLMN, the user PLMN, and/or the operator PLMN, high quality signal PLMNs, and/or low quality signal PLMNs. According to an embodiment, when the home PLMN is LTE/3G 450/05 and the operator PLMN is LTE 450/12, the network list may be arranged as shown in [Table 1].

TABLE 1

| | PLMN |
|---|---|
| 1 | [LTE/3G] 450/05 (from cellular network) |
| 2 | [LTE] 450/12 (from around other devices) |
| 3 | [LTE] 450/06 (from around other devices) |
| 4 | [LTE/3G] 450/08 (from cellular network) |

For example, the PLMNs (LTE/3G 450/05 and/or LTE 450/12) corresponding to the home PLMN, the user PLMN, and/or the operator PLMN among the PLMNs included in the network list may be arranged according to a predetermined priority. For example, PLMNs (for example, LTE 450/06) which do not correspond to the home PLMN, the user PLMN, and/or the operator PLMN among the PLMNs acquired from the external electronic device 220 included in the network list may be arranged according to an arrangement rule of the high quality signal PLMN (for example, random order). For example, PLMNs (for example, LTE/3G 450/08) which do not correspond to the home PLMN, the user PLMN, and/or the operator PLMN among the PLMNs acquired from the external electronic device 220 included in the network list may be classified into high quality signal PLMNs or low quality signal PLMNs based on the signal quality of the serving cell. For example, the PLMNs classified as the high quality signal PLMNs may be arranged according to the arrangement rule of the high quality signal PLMN. For example, the PLMNs classified as the low quality signal PLMNs may be arranged based on a signal quality of each PLMN.

According to an embodiment, the network list may be arranged such that PLMNs collected through the network scan related to the cellular network are distinguished from PLMNs acquired from the external electronic device 220 as shown in [Table 2].

TABLE 2

| | PLMN |
|---|---|
| 1 | [LTE/3G] 450/05 (from cellular network) |
| 2 | [LTE/3G] 450/08 (from cellular network) |
| 3 | [LTE] 450/12 (from around other devices) |
| 4 | [LTE] 450/06 (from around other devices) |

According to various embodiments, the electronic device 101 may identify whether there is a network list previously generated based on a user input related to the PLMN scan. According to an embodiment, when there is no previously generated network list, the electronic device 101 may generate the network list of the electronic device 101 according to operations 701 to 707 of FIG. 7. According to an embodiment, when there is the previously generated network list, the electronic device 101 may remove a PLMN which overlaps the previously generated network list from the network list of the electronic device 101 generated according to operations 701 to 707 of FIG. 7. The electronic device 101 may add the network list of the electronic device 101 from which the overlapping PLMN has been removed to the previously generated network list.

Figure 8:
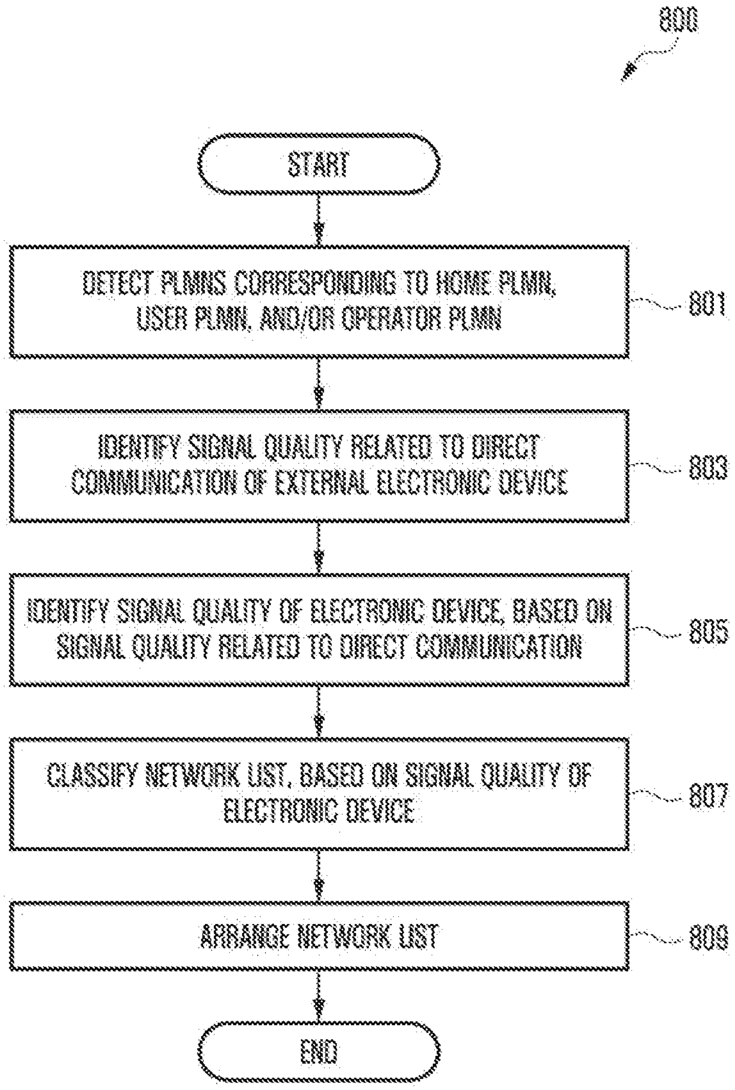
FIG. 8 is a flowchart illustrating a process in which the electronic device arranges a network list according to one or more embodiments.

FIG. 8 is a flowchart 800 illustrating a process in which the electronic device arranges the network list according to various embodiments. According to an embodiment, at least some of FIG. 8 may be detailed operations of operation 409 of FIG. 4. In the following embodiments, respective operations may be sequentially performed but the sequential performance is not necessary. For example, the sequence of respective operations may be changed, and at least two operations may be performed in parallel. For example, the electronic device of FIG. 8 may be the electronic device 101 of FIG. 1, FIG. 2, or FIG. 3.

According to various embodiments referring to FIG. 8, when a network list of the electronic device 101 is generated (or updated) (for example, operation 407 of FIG. 4), the electronic device (for example, the processor 120 of FIG. 1 or the processor 300 of FIG. 3) may detect a PLMN corresponding to a home PLMN, a user PLMN, and/or an operator PLMN in the network list in operation 801.

According to various embodiments, the electronic device (for example, the processor 120 or 300) may identify a signal quality of direct communication related to the remaining PLMNs which do not correspond to the home PLMN, the user PLMN, and/or the operator PLMN among the PLMNs included in the network list in operation 803. According to an embodiment, the processor 300 may identify the signal quality of direct communication related to the remaining PLMNs in network information of the external electronic device 220 acquired through direct communication. For example, the signal quality of direct communication is a quality of a signal (for example, a BLE advertising message) received by the external electronic device 220 through direct communication and may include reference signal received power (RSRP) of the received signal, reference signal received quality (RSRQ), received signal code power (RSCP), and/or receiver signal strength indicator (RSSI).

According to various embodiments, the electronic device (for example, the processor 120 or 300) may identify a signal quality of the electronic device 101 related to the remaining PLMNs based on a signal quality of direct communication related to the remaining PLMNs which do not correspond to the home PLMN, the user PLMN, and/or the operator PLMN among the PLMNs which are not included in the network list in operation 805. According to an embodiment, when the signal quality (for example, RSSI) of direct communication related to a first PLMN among the remaining PLMNs is smaller than a first reference value, the processor 300 may determine that the external electronic device 220 related to the first PLMN is spaced apart from the location of the electronic device 101 by a predetermined distance. When the distance between the external electronic device 220 and the electronic device 101 is longer than a predetermined distance, the processor 300 may determine that a difference between the signal quality of the serving cell of the external electronic device 220 and the signal quality of the serving cell of the electronic device 101 is relatively large. Accordingly, the processor 300 may estimate the signal quality of the electronic device 101 related to the first PLMN by removing a predetermined first value from the signal quality of the serving cell related to the first PLMN.

According to an embodiment, when a signal quality (for example, RSSI) of direct communication related to a second PLMN among the remaining PLMNs is larger than or equal to r the first reference value, the processor 300 may determine that the external electronic device 220 related to the second PLMN is located within a predetermined distance from the location of the electronic device 101. When the distance between the external electronic device 220 and the electronic device 101 is shorter than a predetermined distance, the processor 300 may determine that the signal quality of the serving cell of the electronic device 101 is relatively lower than the signal quality of the serving cell of the external electronic device 220. Accordingly, the processor 300 may estimate the signal quality of the electronic device 101 related to the second PLMN by removing a predetermined second value smaller than the predetermined first value from the signal quality of the serving cell related to the second PLMN.

According to various embodiments, the electronic device (for example, the processor 120 or 300) may classify the remaining PLMNs which do not correspond to the home PLMN, the user PLMN, and/or the operator PLMN among the PLMNs included in the network list into high quality signal PLMNs and low quality signal PLMNs based on the signal quality of the electronic device 101 related to the remaining PLMNs in operation 807. According to an embodiment, the processor 300 may classify PLMNs having a signal quality of the electronic device 101 related to the PLMN, which satisfies a predetermined first quality, as high quality signal PLMNs among the remaining PLMNs which do not correspond to the home PLMN, the user PLMN, and/or the operator PLMN among the PLMNs included in the network list. For example, in the case of an NR network or an LTE network, the state satisfying the predetermined first quality may include the state in which the signal quality (for example, RSRP) of the electronic device 101 related to the PLMN is higher than or equal to about −110 dBm. For example, in the case of a wideband code division multiple access (WCDMA) network supporting frequency division duplex (FDD), the state satisfying the predetermined first quality may include the state in which the signal quality (for example, RSCP) of the electronic device 101 related to the PLMN is higher than or equal to about −95 dBm. For example, in the case of a WCDMA network supporting time division duplex (TDD), the state satisfying the predetermined first quality may include the state in which the signal quality (for example, RSCP) of the electronic device 101 related to the PLMN is higher than or equal to about −84 dBm. For example, in the case of a GSM network, the state satisfying the predetermined first quality may include the state in which the signal quality (for example, RSSI) of the electronic device 101 related to the PLMN is higher than or equal to about −85 dBm.

According to an embodiment, the processor 300 may classify PLMNs having a signal quality of the electronic device 101 related to the PLMN, which does not satisfy the predetermined first quality, as low quality signal PLMNs among the remaining PLMNs which do not correspond to the home PLMN, the user PLMN, and/or the operator PLMN among the PLMNs included in the network list.

According to various embodiments, the electronic device (for example, the processor 120 or 300) may arrange (or sort) the PLMNs included in the network list on the arrangement rule of PLMNs corresponding to the home PLMN, the user PLMN, and/or the operator PLMN, the high quality signal PLMN and/or the low quality signal PLMN in operation 809. For example, the PLMNs corresponding to the home PLMN, the user PLMN, and/or the operator PLMN may be arranged based on a predetermined priority. For example, the PLMNs classified into the high quality signal PLMNs may be randomly arranged based on a PLMN arrangement rule. For example, the PLMNs classified into the low quality signal PLMNs may be arranged based on a signal quality of each PLMN.

Figure 9:
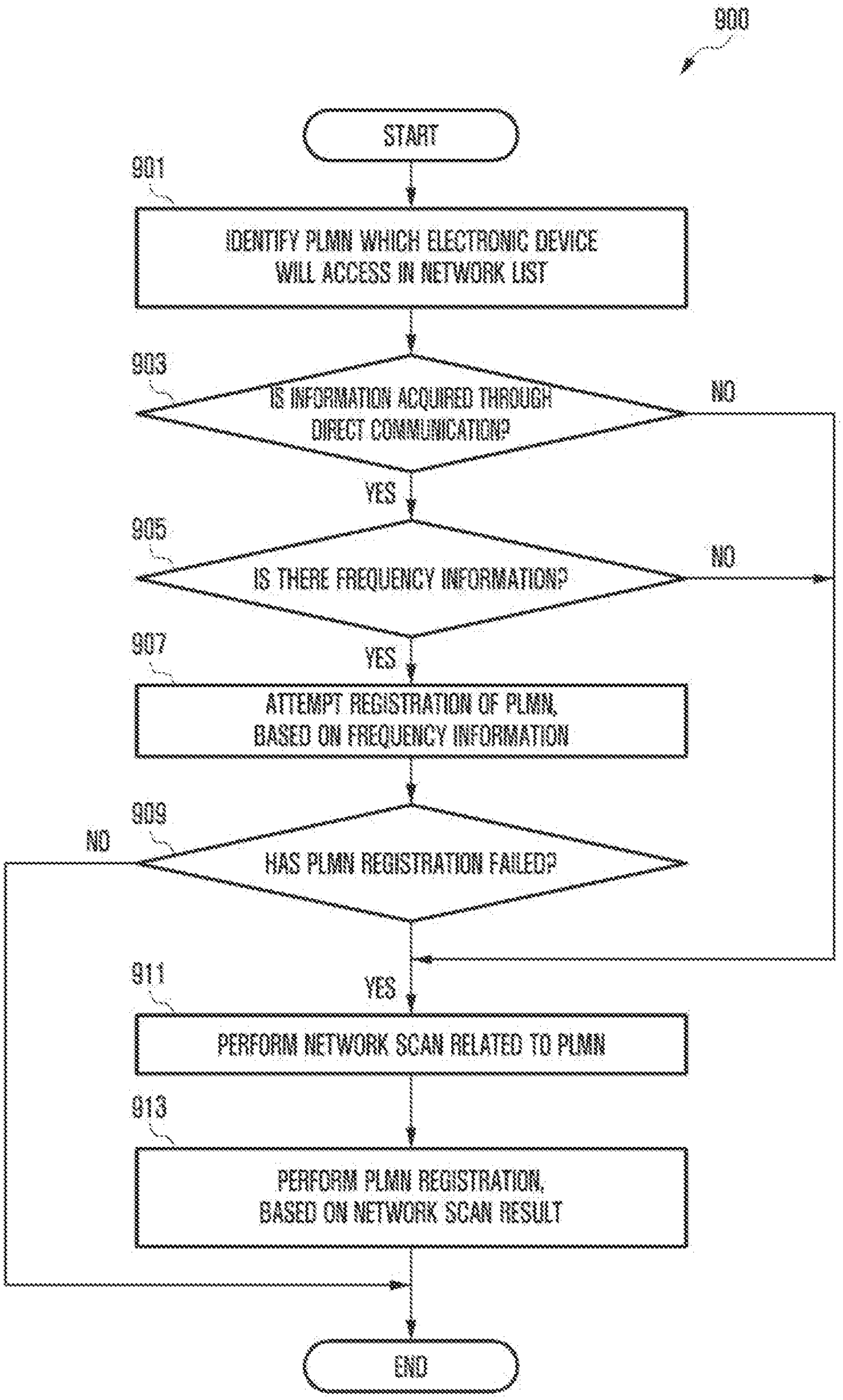
FIG. 9 is a flowchart illustrating a process in which the electronic device registers a PLMN according to one or more embodiments.

FIG. 9 is a flowchart 900 illustrating a process in which the electronic device registers a PLMN according to various embodiments. In the following embodiments, respective operations may be sequentially performed but the sequential performance is not necessary. For example, the sequence of respective operations may be changed, and at least two operations may be performed in parallel. For example, the electronic device of FIG. 9 may be the electronic device 101 of FIG. 1, FIG. 2, or FIG. 3.

According to various embodiments referring to FIG. 9, when a network list of the electronic device 101 is output (for example, operation 409 of FIG. 4), the electronic device (for example, the processor 120 of FIG. 1 or the processor 300 of FIG. 3) may identify information related to a PLMN which the electronic device 101 desires to register based on an input related to the network list displayed on the display 340 in operation 901. For example, the information related to the PLMN which the electronic device 101 desires to register may include information related to a PLMN selected based on a user input detected through the input device 330 among the information related to the PLMNs included in the network list displayed on the display 340.

According to various embodiments, the electronic device (for example, the processor 120 or 300) may identify whether the information related to the PLMN which the electronic device 101 desires to register is acquired through direct communication in operation 903. According to an embodiment, when the information related to the PLMN which the electronic device 101 desires to register is collected through direct communication and a network scan related to the cellular communication, the processor 300 may determine that the information is acquired through eth network scan related to the cellular network.

According to various embodiments, when it is determined that the information related to the PLMN which the electronic device 101 desires to register is not acquired through direct communication (for example, "No" of operation 903), the electronic device (for example, the processor 120 or 300) may perform a network scan related to the PLMN which the electronic device 101 desires to register in operation 911.

According to various embodiments, when it is determined that the information related to the PLMN which the electronic device 101 desires to register is acquired through direct communication (for example, "Yes" of operation 903), the electronic device (for example, the processor 120 or 300) may identify whether there is frequency information related to the PLMNs which the electronic device 101 desires to register in operation 905. According to an embodiment, the processor 300 may identify whether a frequency of the serving cell is included in network information of the external electronic device 220 corresponding to the PLMN which the electronic device 101 desires to register, acquired through direct communication.

According to various embodiments, when there is no frequency information related to the PLMN which the electronic device 101 desires to register ("No" of operation 905), the electronic device (for example, the processor 120 or 300) may perform the network scan related to the PLMN which the electronic device 101 desires to register in operation 911.

According to various embodiments, when there is frequency information related to the PLMN which the electronic device 101 desires to register (for example, "Yes" of operation 905), the electronic device (for example, the processor 120 or 300) may attempt registration of the PLMN based on the frequency information related to the PLMN which the electronic device 101 desires to register in operation 907. According to an embodiment, the processor 300 may control the first communication circuit 310 to perform the network scan based on the frequency related to the PLMN which the electronic device 101 desires to register. When a cell satisfying a predetermined cell selection reference is found through the network scan based on the frequency related to the PLMN, the processor 300 may control the first communication circuit 310 to transmit a message related to a request for access to (or a request for registration of) the corresponding cell According to various embodiments, the electronic device (for example, the processor 120 or 300) may identify whether the electronic device 101 fails registration of the PLMN which the electronic device 101 desires to register in operation 909. According to an embodiment, when a message related to acceptance of the access (or acceptance of the registration) is received in response to the message related to the access request (or registration request) through the first communication circuit 310, the processor 300 may determine that registration of the PLMN which the electronic device 101 desires to register is successful. According to an embodiment, when a message related to access rejection (or registration rejection) is received in response to the message related to the access request (or registration request) through the first communication circuit 310, the processor 300 may determine that registration of the PLMN which the electronic device 101 desires to register has failed. According to an embodiment, when the cell satisfying the predetermined selection reference is not found through the network scan based on the frequency related to the PLMN, the processor 300 may determine that registration of the PLMN which the electronic device 101 desires to register has failed.

According to various embodiments, it is determined that the access to the PLMN which the electronic device 101 desires to register is successful (for example, "No" of operation 909), the electronic device (for example, the processor 120 or 300) may end an embodiment for registering the PLMN.

According to various embodiments, when it is determined that the registration of the PLMN which the electronic device 101 desires to register has failed (for example, "Yes" of operation 909), the electronic device (for example, the processor 120 or 300) may perform the network scan related to the PLMN which the electronic device 101 desires to register in operation 911. According to an embodiment, the processor 300 may control the first communication circuit 310 to perform the network scan related to a frequency band supported by the PLMN which the electronic device 101 desires to register. For example, the frequency band supported by the PLMN which the electronic device 101 desires to register may include a frequency band for each radio access technology.

According to various embodiments, the electronic device (for example, the processor 120 or 300) may register the PLMN based on the result of the network scan in operation 913. According to an embodiment, the processor 300 may control the first communication circuit 310 to access a cell satisfying a predetermined cell selection reference, found through the network scan. For example, the cell satisfying the predetermined cell selection reference may include the state in which information on an electric field of the cell is larger than a predefined reference value.

Figure 10:
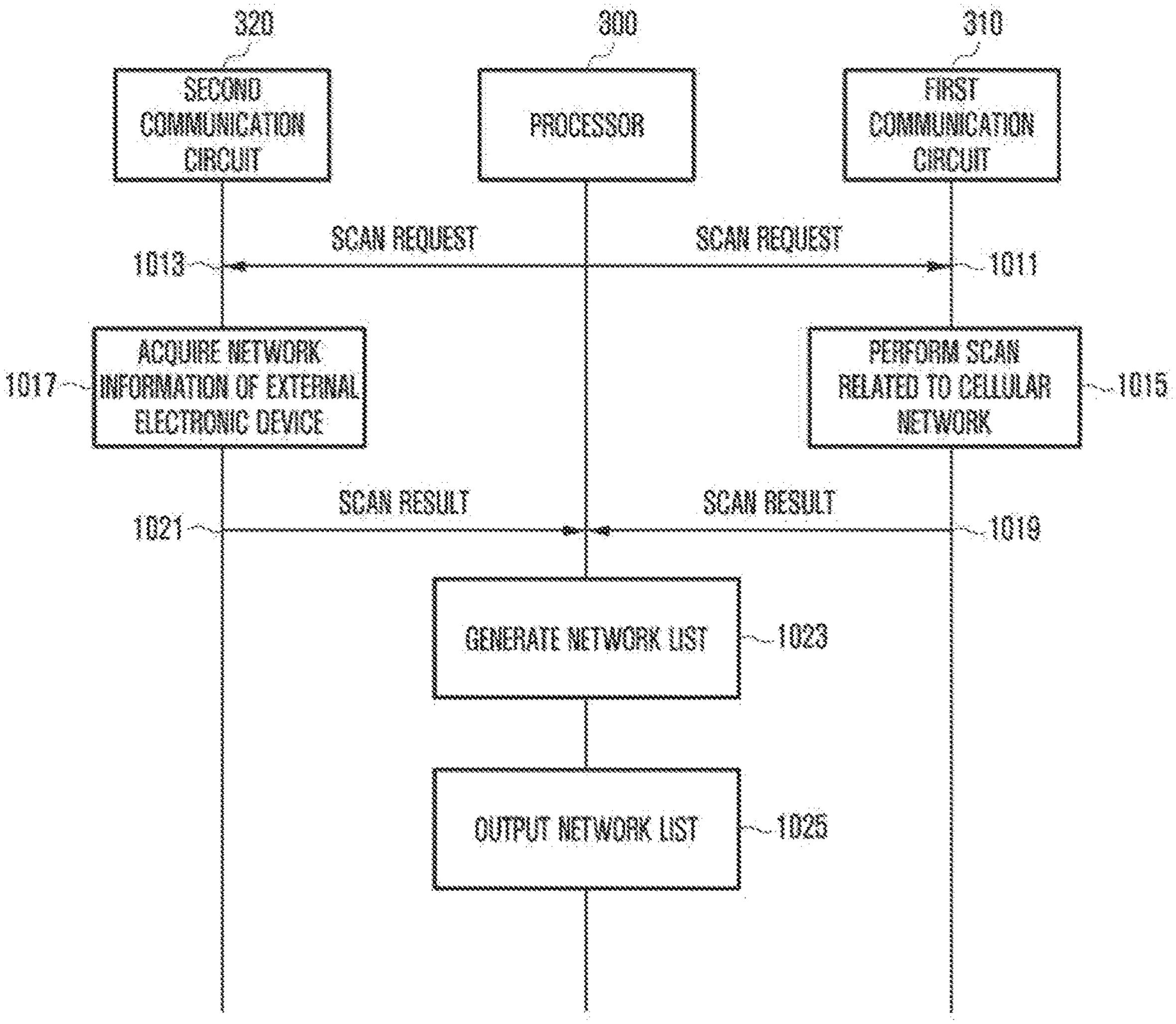
FIG. 10 illustrates an example for a PLMN scan by the electronic device according to one or more embodiments.

FIG. 10 illustrates an example for a PLMN scan by the electronic device according to various embodiments.

According to various embodiments referring to FIG. 10, when an input for the PLMN scan is detected through the input device 330, the processor 300 (for example, an application processor) of the electronic device 101 may transmit a scan request signal to the first communication circuit 310 and the second communication circuit 320 in operation 1011 and operation 1013.

According to various embodiments, the first communication circuit 310 (for example, a communication processor) of the electronic device 101 may perform a network scan related to a cellular network based on the scan request signal in operation 1015. According to an embodiment, the first communication circuit 310 may perform a network scan related to at least some of frequency bands (or frequencies) which are selected according to a predetermined priority and can be supported by the electronic device 101 in operation 1015. For example, the network scan (for example, PLMN scan) related to the cellular network may include a series of operations for searching for PLMNs which can be registered by the electronic device 101 through the network scan based on the frequency bands which can be supported by the electronic device 101.

According to an embodiment, the first communication circuit 310 may transmit a network scan result to the processor 300 in operation 1019. For example, the network scan result may include information related to at least one PLMN collected through the network scan (for example, PLMN scan) related to the cellular network.

According to various embodiments, the second communication circuit 320 of the electronic device 101 may acquire network information of at least one external electronic device 220 through direct communication based on a scan request signal in operation 1017. According to an embodiment, the second communication circuit 320 may transmit a request message related to network information through direct communication. The second communication circuit 320 may acquire network information of at least one external electronic device 220 from the response message related to network information received in response to the request message related to the network information. For example, the request message related to the network information may include a BLE advertising message including indication information related to a request for the network information. For example, the response message related to the network information may include a BLE advertising message including indication information related to a response of the network information and network information of the external electronic device 220.

According to an embodiment, the second communication circuit 320 may transmit the network information of at least one external electronic device 220 acquired through direct communication to the processor 300 in operation 1021. For example, the network information of at least one external electronic device 220 acquired through direct communication may include information related to at least one PLMN collected through direct communication. For example, the network information of the external electronic device 220 may include information related to a serving PLMN of the external electronic device 220, serving RAT (or serving frequency band), a frequency of the serving cell, a signal quality of the serving cell, and/or a signal quality of direct communication.

According to various embodiments, the processor 300 may generate (or update) a network list based on the result of the network scan related to the cellular network and/or the network information of the external electronic device 220 acquired through direct communication in operation 1023. According to an embodiment, the processor 300 may generate the network list of the electronic device 101 based on operation 701 to operation 707 of FIG. 7. According to an embodiment, when there is a previously generated network list, the processor 300 mat remove a PLMN overlapping the previously generated network list from the network list of the electronic device 101 based on operation 701 to operation 707 of FIG. 7. The processor 300 may generate (or update) the network list by adding the network list of the electronic device 101 from which the overlapping PLMN has been removed to the previously generated network list.

According to various embodiments, the processor 300 may output information related to the network list through the display 340 in operation 1025.

According to various embodiments, the first communication circuit 310 may periodically perform the network scan (for example, PLMN scan) related to the cellular network according to a predetermined first period until the network scan is performed for all frequency bands which can be supported by the electronic device 101.

According to various embodiments, the second communication circuit 320 may periodically acquire network information of at least one external electronic device 220 through direct communication according to a predetermined second period until the network scan related to the cellular network is completed.

According to various embodiments, the processor 300 may generate (or update) the network list according to the predetermined first period and/or the predetermined second period. According to an embodiment, when receiving the result of the network scan related to the cellular network through the first communication circuit 310 according to the predetermined first period or receiving network information of at least one external electronic device 220 through the second communication circuit 320 according to the predetermined second period, the processor 300 may generate (or update) the network list.

Figure 11:
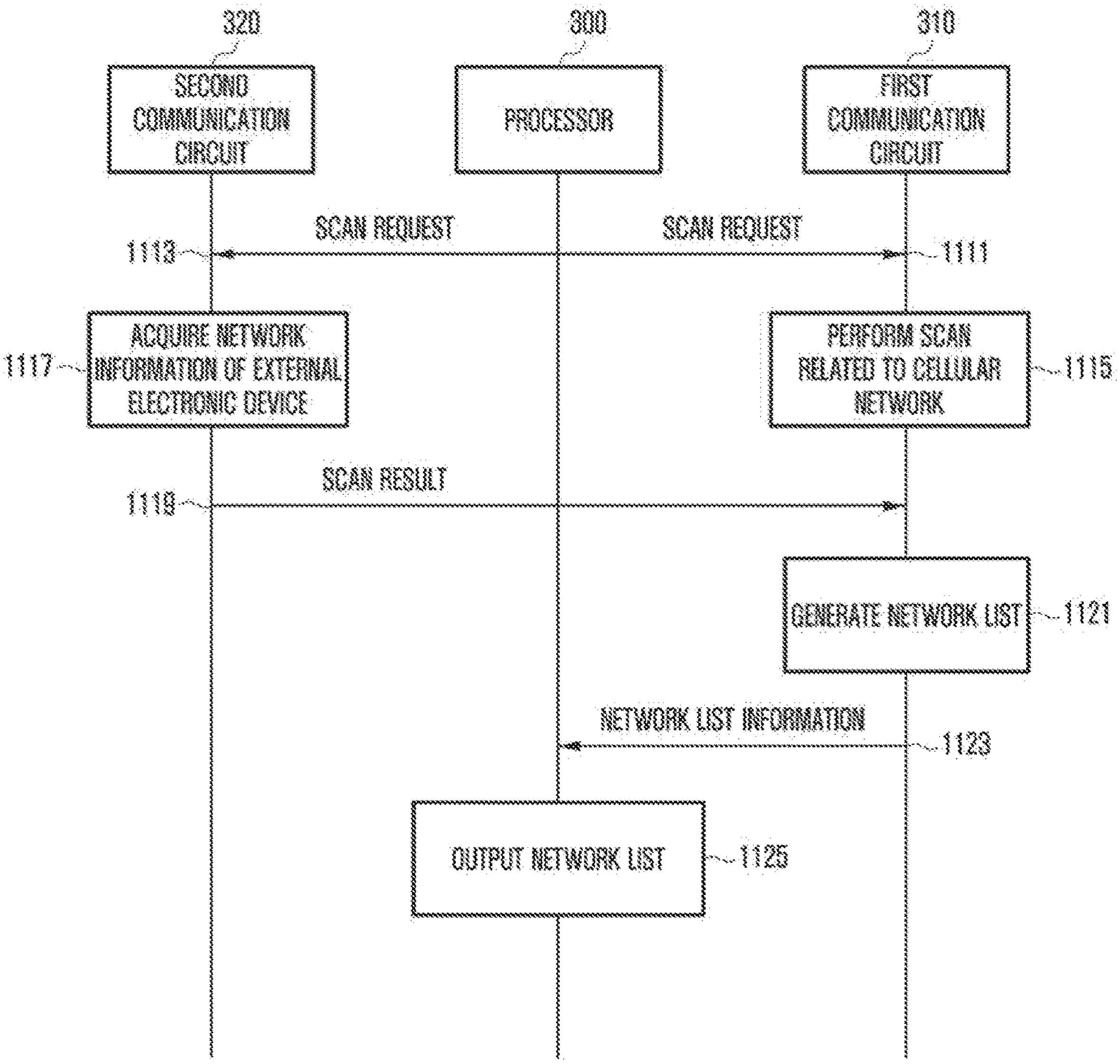
FIG. 11 illustrates another example for the PLMN scan by the electronic device according to one or more embodiments.

FIG. 11 illustrates another example for the PLMN scan by the electronic device according to various embodiments.

According to various embodiments referring to FIG. 11, when an input for the PLMN scan is detected through the input device 330, the processor 300 (for example, an application processor) of the electronic device 101 may transmit a scan request signal to the first communication circuit 310 and the second communication circuit 320 in operation 1111 and operation 1113.

According to various embodiments, the first communication circuit 310 (for example, a communication processor) of the electronic device 101 may perform a network scan related to a cellular network based on the scan request signal in operation 1115. According to an embodiment, the first communication circuit 310 may perform a network scan related to at least some of frequency bands (or frequencies) which are selected according to a predetermined priority and can be supported by the electronic device 101 in operation 1115.

According to various embodiments, the second communication circuit 320 of the electronic device 101 may acquire network information of at least one external electronic device 220 through direct communication based on a scan request signal in operation 1117. According to an embodiment, the second communication circuit 320 may transmit a request message related to network information through direct communication. The second communication circuit 320 may receive network information of at least one external electronic device 220 in response to the request message related to the network information.

According to an embodiment, the second communication circuit 320 may transmit the network information of at least one external electronic device 220 acquired through direct communication to the first communication circuit 310 in operation 1119. For example, the network information of at least one external electronic device 220 acquired through direct communication may include information related to at least one PLMN collected through direct communication.

According to various embodiments, the first communication circuit 310 may generate (or update) the network list based on the result of the network scan related to the cellular network and/or the network information of at least one external electronic device 220 acquired through direct communication in operation 1121. According to an embodiment, the first communication circuit 310 may generate the network list of the electronic device 101 based on operation 701 to operation 707 of FIG. 7. According to an embodiment, when there is a previously generated network list, the first communication circuit 310 may remove a PLMN overlapping the previously generated network list from the network list of the electronic device 101 generated based on operation 701 to operation 707 of FIG. 7. The processor 300 may generate (or update) the network list by adding the network list of the electronic device 101 from which the overlapping PLMN has been removed to the previously generated network list.

According to various embodiments, the first communication circuit 310 may transmit information related to the PLMN to the processor 300 in operation 1123.

According to various embodiments, the processor 300 may output information related to the network list through the display 340 in operation 1125.

According to various embodiments, the first communication circuit 310 may generate (or update) the network list according to the predetermined first period and/or the predetermined second period. According to an embodiment, when the network scan related to the cellular network is performed according to the predetermined first period or when the network information of at least one external electronic device 220 is received through the second communication circuit 320 according to the predetermined second period, the first communication circuit 310 may generate (or update) the network list.

Figure 12:
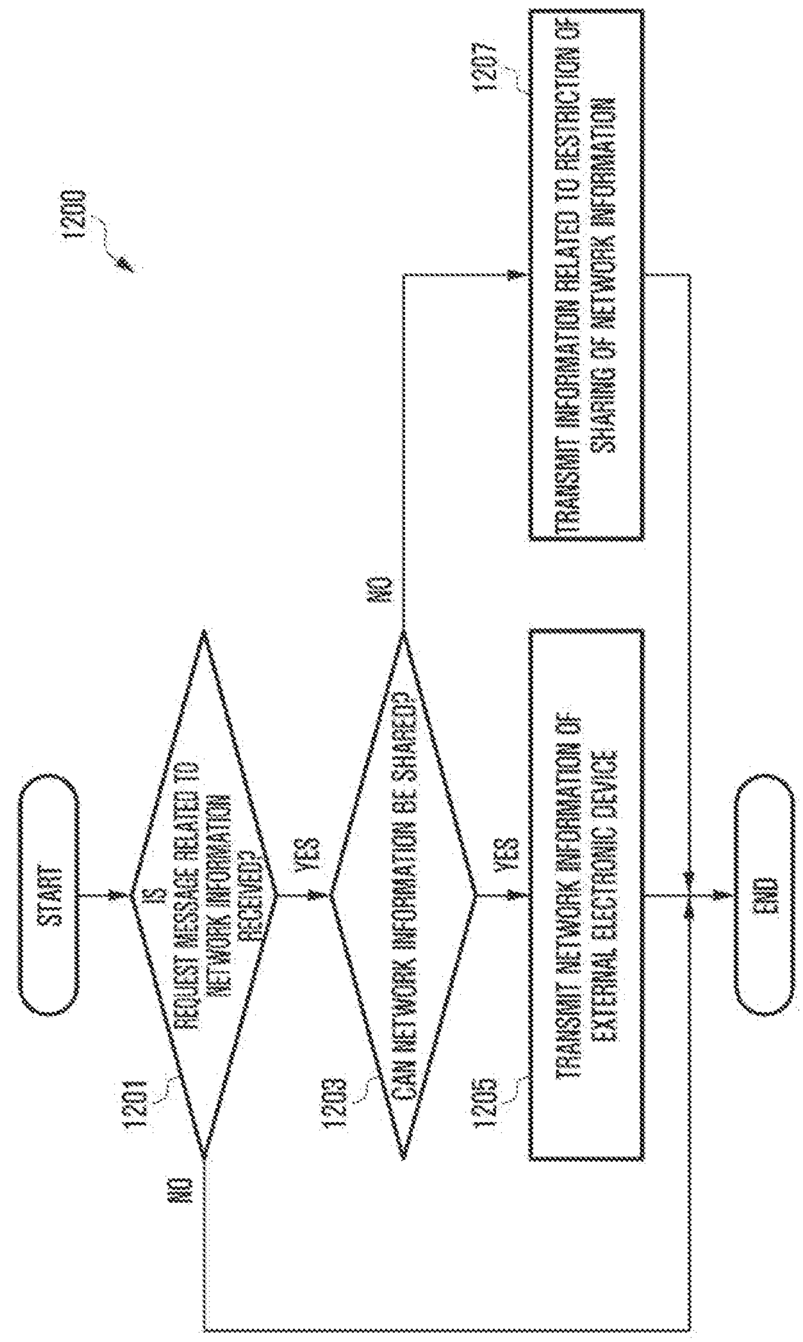
FIG. 12 is a flowchart illustrating a process in which the external electronic device shares network information according to one or more embodiments.

FIG. 12 is a flowchart 1200 illustrating a process in which the electronic device shares network information according to various embodiments. In the following embodiments, respective operations may be sequentially performed but the sequential performance is not necessary. For example, the sequence of respective operations may be changed, and at least two operations may be performed in parallel. For example, the electronic device of FIG. 11 may be the electronic device 101 of FIG. 1, FIG. 2, or FIG. 3.

According to various embodiments referring to FIG. 12, the external electronic device 220 may identify whether a request message related to network information is received through direct communication in operation 1201. For example, the request message related to the network information may include a BLE advertising message including indication information related to a request for network information.

According to various embodiments, when the request message related to the network information is not received through direct communication (for example, "No" of operation 1201), the external electronic device 220 may end an embodiment for sharing the network information of the external electronic device 220.

According to various embodiments, when the request message related to the network information is received through direct communication (for example, "Yes" of operation 1201), the external electronic device 220 may determine whether to share the network information with the electronic device 101 based on the request message related to the network information in operation 1203. According to an embodiment, when the request message related to the network information is received through direct communication, the external electronic device 220 may identify whether the request message related to the network information meets a predetermined sharing condition. When it is determined that the request message related to the network information meets the predetermined sharing condition, the external electronic device 220 may determine whether to share the network information with the electronic device 101. For example, the state in which the predetermined sharing condition is met may include the state in which identification information of the electronic device 101 related to direct communication is included in identification information configured for sharing the network information. For example, the identification information of the electronic device 101 may include a communication service provider (for example, a home PLMN) operating the cellular network which can be supported by the electronic device 101, a manufacturer of the electronic device 101, and/or a predefined sharing identity (ID).

According to various embodiments, when it is determined to share the network information with the electronic device 101 (for example, "Yes" of operation 1203), the external electronic device 220 may transmit the network information of the external electronic device 220 through direct communication in operation 1205. For example, a response message related to the network information may include a BLE advertising message.

According to various embodiments, when it is determined to not share the network information with the electronic device 101 (for example, "No" of operation 1203), the external electronic device 220 may transmit information related to restriction of sharing of the network information through direct communication in operation 1207.

According to various embodiments, a method of operating an electronic device (for example, the electronic device 101 of FIG. 1, FIG. 2, or FIG. 3) may include an operation of performing a network scan related to a cellular network through the first communication circuit, based on an input related to a public land mobile network (PLMN) scan, an operation of acquiring network information of at least one external electronic device through direct communication, based on the input, an operation of generating a network list including at least one PLMN and at least one radio access technology (RAT), based on at least one of a result of the network scan or the network information of the at least one external electronic device, and an operation of outputting information related to the network list.

According to various embodiments, the network information of the external electronic device may include information on at least one of a PLMN of the external electronic device, an RAT of the external electronic device, a frequency band of the RAT, a frequency of a serving cell, a signal quality of the serving cell, or a signal quality of direct communication.

According to various embodiments, the operation of generating the network list may include an operation of detecting a PLMN related to an RAT and/or a frequency band determined to be supported by the electronic device among at least one PLMN included in the network information of the external electronic device and an operation of generating the network list, based on the detected PLMN and a PLMN collected through the network scan.

According to various embodiments, the method may further include, in case that there is a previously generated network list based on an input related to the PLMN scan, an operation of combining the network list generated based on the detected PLMN and the PLMN collected through the network scan and the previously generated network list into one network list.

According to various embodiments, the method may further include an operation of detecting at least one PLMN corresponding to a home PLMN (HPLMN), a user PLMN, and/or an operator PLMN among PLMNs included in the network list, the at least one detected PLMN may be arranged according to a predetermined priority, and at least one PLMN collected through the direct communication may be arranged in a random order among remaining PLMNs except for the at least one detected PLMN in the network list.

According to various embodiments, the method may further include an operation of detecting at least one PLMN corresponding to a home PLMN (HPLMN), a user PLMN, and/or an operator PLMN among PLMNs included in the network list, an operation of measuring a signal quality related to at least one PLMN collected through the direct communication among remaining PLMNs except for the at least one detected PLMN in the network list, and an operation of classifying the at least one PLMN collected through the direct communication among the remaining PLMNs into high quality signal PLMNs and/or low quality signal PLMNs, based on a signal quality of each PLMN, the at least one detected PLMN may be arranged according to a predetermined priority, at least one PLMN classified as the high quality signal PLMNs may be arranged in a random order, and at least one PLMN classified as the low quality signal PLMNs may be arranged based on the signal quality.

According to various embodiments, the operation of estimating the signal quality may include an operation of identifying a signal quality related to the direct communication in the network information of the external electronic device corresponding to at least one PLMN collected through the direct communication among the remaining PLMNs except for the at least one detected PLMN in the network list, an operation of estimating a distance to the electronic device, based on the signal quality related to the direct communication in the network information of the external electronic device corresponding to each PLMN, and an operation of updating a signal quality of a serving cell identified in the network information of the external electronic device corresponding to each PLMN, based on a reference value corresponding to the distance to the electronic device.

According to various embodiments, the operation of outputting the information related to the network list may include an operation of displaying the network list such that at least one PLMN collected through the network scan included in the network list is distinguished from at least one PLMN collected through the direct communication.

According to various embodiments, the direct communication may include direct communication based on at least one of a WLAN (for example, Wi-Fi), Bluetooth, Bluetooth low energy (BLE), or ultra-wideband (UWB).

Embodiments of the disclosure in the specification and the drawings are presented as specific examples to describe the technical content and help with understanding the one or more embodiments of the disclosure, and do not intent to limit the scope of the embodiments of the disclosure. Accordingly, it should be construed that not only the embodiments disclosed herein but also all modifications or modified forms derived from the technical ides of various embodiments of the disclosure are included in the scope of the various embodiments of the disclosure.

What is claimed is:

1. An electronic device comprising:

a display;

memory storing instructions;

a first communication circuit configured to support cellular communication;

a second communication circuit configured to support Bluetooth low energy (BLE) communication; and at least one processor operatively connected to the display, the memory, the first communication circuit, and the second communication circuit, wherein the instructions, when executed by the at least one processor, cause the electronic device to:

based on a first user input for manual scan, perform a public land mobile network (PLMN) scan through the first communication circuit, and acquire PLMN information of at least one external electronic device using a BLE advertising message received from the at least one external electronic device;

identify at least one PLMN information supported by the electronic device among the acquired PLMN information;

generate a PLMN list based on at least one PLMN information scanned through the PLMN scan and the identified at least one PLMN information among the acquired PLMN information;

display the generated PLMN list through the display;

identify PLMN information selected by a second user input from the displayed PLMN list;

scan a frequency related to the selected PLMN information; and perform a network scan for the PLMN when a registration fails based on scan results of the frequency related to the selected PLMN information.

2. The electronic device of claim 1, wherein the instructions, when executed by the at least one processor, cause the electronic device to:

transmit a request message related to PLMN information to the at least one external electronic device through the BLE communication, receive the BLE advertising message corresponding to the request message from the at least one external electronic device through the BLE communication, and acquire the PLMN information of the at least one external electronic device included in the received BLE advertising message.

3. The electronic device of claim 1, wherein the instructions, when executed by the at least one processor, cause the electronic device to, when a previously generated PLMN list exists, combine the generated PLMN list and the previously generated PLMN list into one PLMN list, display the combined PLMN list through the display.

4. The electronic device of claim 1, wherein the generated PLMN list is displayed such that: at least one PLMN corresponding to at least one of a home PLMN (HPLMN), a user PLMN, or an operator PLMN among PLMNs included in the generated PLMN list, is arranged according to a predetermined priority, and at least one remaining PLMN, among the identified at least one PLMN information, excluding the at least one PLMN arranged based on the predetermined priority, is arranged in a random order.

5. The electronic device of claim 1, wherein the instructions, when executed by the at least one processor, cause the electronic device to:

select at least one PLMN corresponding to at least one of a home PLMN (HPLMN), a user PLMN, or an operator PLMN among PLMNs from the generated PLMN list;

identify a signal quality of the electronic device related to the identified at least one PLMN information; and classify at least one remaining PLMN, among the identified at least one PLMN information, excluding the selected at least one PLMN, into high quality signal PLMN or low quality signal PLMN, based on the identified signal quality of the electronic device, wherein the generated PLMN list is displayed such that: the selected at least one PLMN is arranged according to a predetermined priority, at least one PLMN classified as the high quality signal PLMN is arranged in a random order, and at least one PLMN classified as the low quality signal PLMN is arranged based on the identified signal quality of the electronic device.

6. The electronic device of claim 5, wherein the instructions, when executed by the at least one processor, cause the electronic device to:

estimate a distance between the electronic device and the at least one external electronic device based on a signal quality related to the BLE communication, wherein the signal quality related to the BLE communication is obtained from the acquired PLMN information; and determine the signal quality of the electronic device related to the identified at least one PLMN information by updating a signal quality of a serving cell of the at least one external electronic device based on the estimated distance, wherein the signal quality of the serving cell of the at least one external electronic device is obtained from the acquired PLMN information.

7. The electronic device of claim 6, wherein the instructions, when executed by the at least one processor, cause the electronic device to:

display, via the display, the generated PLMN list such that the at least one PLMN information scanned through the PLMN scan included in the generated PLMN list is distinguished from the identified at least one PLMN information.

8. A method of operating an electronic device, the method comprising:

based on a first user input for manual scan, performing a public land mobile network (PLMN) scan related to a cellular network, and;

acquiring PLMN information of at least one external electronic device using a Bluetooth low energy (BLE) advertising message received from the at least one external electronic device, based on the input;

identifying at least one PLMN information supported by the electronic device among the acquired PLMN information;

generating a PLMN list based on at least one PLMN information scanned through the PLMN scan and the identified at least one PLMN information among the acquired PLMN information;

displaying the generated PLMN list;

identifying PLMN information selected by a second user input from the displayed PLMN list;

scanning a frequency related to the selected PLMN information; and performing a network scan for the PLMN when a registration fails based on the scan results of the frequency related to the selected PLMN information.

9. The method of claim 8, wherein the acquiring the PLMN information comprises:

transmitting a request message related to PLMN information to at least one external electronic device through a BLE communication;

receiving the BLE advertising message corresponding to the request message from the at least one external electronic device through the BLE communication; and acquiring the PLMN information of the at least one external electronic device included in the received BLE advertising message.

10. The method of claim 9, further comprising, when a previously generated PLMN list exists, combining the generated PLMN list and the previously generated PLMN list into one PLMN list; and displaying the combined PLMN list.

11. The method of claim 8, the generated PLMN list is displayed such that:

at least one PLMN corresponding to at least one of a home PLMN (HPLMN), a user PLMN, or an operator PLMN among PLMNs included in the generated PLMN list is arranged according to a predetermined priority, and at least one remaining PLMN, among the identified at least one PLMN information, excluding the at least one PLMN arranged based on the predetermined priority, is arranged in a random order.

12. The method of claim 8, further comprising:

selecting at least one PLMN corresponding to at least one of a home PLMN (HPLMN), a user PLMN, or an operator PLMN among PLMNs from the generated PLMN list;

identifying a signal quality of the electronic device related to the identified at least one PLMN information; and classifying at least one remaining PLMN, among the identified at least one PLMN information, excluding the selected at least one PLMN, into high quality signal PLMN or low quality signal PLMN, based on the identified signal quality of the electronic device, wherein the generated PLMN list is displayed such that:

the selected at least one PLMN is arranged according to a predetermined priority, at least one PLMN classified as the high quality signal PLMN is arranged in a random order, and wherein at least one PLMN classified as the low quality signal PLMN is arranged based on the identified signal quality of the electronic device.

13. The method of claim 12, wherein the estimating of the signal quality comprises:

estimating a distance between the electronic device and the at least one external electronic device, based on a signal quality related to the BLE communication, wherein the signal quality related to the BLE communication is obtained from the acquired PLMN information; and determining the signal quality of the electronic device related to the identified at least one PLMN information by updating a signal quality of a serving cell of the at least one external electronic device based on the estimated distance, wherein the signal quality of the serving cell of the at least one external electronic device is obtained from the acquired PLMN information.

14. The method of claim 13, wherein the displaying the generated PLMN list comprises:

displaying the generated PLMN list such that the at least one PLMN information scanned through the PLMN scan included in the generated PLMN list is distinguished from the identified at least one PLMN information.

* * * * *